(12) United States Patent
Ohya

(10) Patent No.: US 7,118,136 B2
(45) Date of Patent: Oct. 10, 2006

(54) SLEEVE-TYPE PIPE JOINT

(75) Inventor: Hiroshi Ohya, Gifu-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 46 days.

(21) Appl. No.: 10/829,157

(22) Filed: Apr. 22, 2004

(65) Prior Publication Data

US 2004/0195831 A1    Oct. 7, 2004

Related U.S. Application Data

(62) Division of application No. 09/875,912, filed on Jun. 8, 2001, now Pat. No. 6,749,233.

(30) Foreign Application Priority Data

Jun. 8, 2000    (JP)    ............................. 2001-171854
Jul. 27, 2000   (JP)    ............................. 2000-226593

(51) Int. Cl.
  *F16L 37/00*    (2006.01)
(52) U.S. Cl. .................. 285/3; 285/322; 285/255; 285/243
(58) Field of Classification Search .............. 285/3, 285/4, 322, 255, 323, 249, 243
See application file for complete search history.

(56) References Cited

U.S. PATENT DOCUMENTS

| | | | |
|---|---|---|---|
| 2,452,276 A * | 10/1948 | Woodling ...................... 285/3 |
| 2,544,109 A * | 3/1951  | Richardson ................... 285/3 |
| 3,250,550 A * | 5/1966  | Lyon ............................. 285/3 |
| 4,214,586 A   | 7/1980  | Mericle ....................... 285/370 |
| 4,304,422 A * | 12/1981 | Schwarz ........................ 285/4 |
| 4,621,842 A   | 11/1986 | Kowal et al. |
| 4,632,435 A   | 12/1986 | Polyak ........................ 285/243 |
| 4,632,437 A   | 12/1986 | Robson et al. .............. 285/243 |
| 4,685,706 A   | 8/1987  | Kowal et al. |
| 5,116,087 A   | 5/1992  | Hopperdietzel |
| 5,474,336 A   | 12/1995 | Hoff et al. ................... 285/322 |
| 5,511,830 A   | 4/1996  | Olson et al. ................ 285/243 |

(Continued)

FOREIGN PATENT DOCUMENTS

DE    38 13 815 A1    11/1989

(Continued)

OTHER PUBLICATIONS

Academic Press, Academic Press Dictionary of Science and Technology, 1997, p. 467, showing definition of "collet".

*Primary Examiner*—David Bochna
(74) *Attorney, Agent, or Firm*—Finnegan, Henderson, Farabow, Garrett & Dunner L.L.P.

(57) ABSTRACT

A sleeve-type pipe joint 10 has a joint body 11 having a cylindrical projection 12 adapted to be inserted into a pipe 40 to be connected; a ring member 20 having a larger inner diameter than an outer diameter of the pipe 40; and a resiliently deformable, cylindrical sleeve member 30 moved into a space between the ring member 20 and the pipe 40, at least one of an inner surface of the ring member 20 and an outer surface of the sleeve member 30 being provided with a tapered portion, such that when the sleeve member 30 is moved into the ring member 20, the sleeve member 30 is deformed inward, resulting in tight connection of the inner surface of the pipe 40 to the outer surface of the cylindrical projection 12. When the ring member 20, the sleeve member 30, and the joint body 11 are assembled, the ring member 20 and the sleeve member 30 resist detachment from the assembled pipe joint 10.

8 Claims, 22 Drawing Sheets

U.S. PATENT DOCUMENTS

| | | | |
|---|---|---|---|
| 6,145,894 A | 11/2000 | Myers | 285/322 |
| 6,170,887 B1 | 1/2001 | Salomon-Bahls et al. | 285/322 |
| 6,231,085 B1 | 5/2001 | Olson | 285/255 |
| 6,447,019 B1 | 9/2002 | Hosono et al. | 285/323 |

FOREIGN PATENT DOCUMENTS

DE  41 35 422 A1  4/1993

* cited by examiner

SLEEVE-TYPE PIPE JOINT

This is a division of application Ser. No. 09/875,912, filed Jun. 8, 2001 now U.S. Pat. No. 6,749,233, which claims the foreign priority benefit of Japanese applications Nos. 2000-171854 and 2000-226593, filed on Jun. 8, 2000 and Jul. 27, 2000, respectively, all incorporated herein by reference.

FIELD OF THE INVENTION

The present invention relates to a sleeve-type pipe joint for connecting resin or thin metal pipes, particularly to a sleeve-type pipe joint having parts that are not separated in an assembled state and capable of connecting pipes by a single operation with a tool.

BACKGROUND OF THE INVENTION

Resin pipes made of polyethylene, polypropylene, polybutene, polyvinyl chloride, etc. have widely been used as fluid-conveying pipes such as gas pipes, running water pipes, etc. There are various methods for connecting these resin pipes, and the most widely used method is a type in which a nut is screwed to a joint body, a mechanical connecting method comprising mounting a locking ring member and a packing between the joint body and the nut, and screwing the nut with a wrench to compress the locking ring member and the packing to achieve sealing.

However, the above mechanically connectable pipe joint is disadvantageous in that it is impossible to confirm after the fastening operation whether or not the pipe is fully inserted into the pipe joint, and that it is also difficult to confirm how tight the nut is fastened, resulting in unevenness in the performance of the pipe connection. The confirmation of how well the pipe joint is connected is only a leak test after the fastening operation. Even if the connected pipe joint has passed the leak test conducted for a short period of time after the fastening operation, the detachment of the pipe from the pipe joint and leak are likely to take place during a long period of use.

OBJECT OF THE INVENTION

Accordingly, objects of embodiments of the present invention include providing a sleeve-type pipe joint capable of surely connecting pipes by a simple fastening operation with a relatively small tool, of not causing such problems as insufficient insertion of pipes, insufficient fastening of nuts, erroneous positioning of locking ring members, and unevenness of connecting strength, and of easily confirming after the fastening operation how well the pipes are connected.

DISCLOSURE OF THE INVENTION

The first sleeve-type pipe joint of the present invention comprises a joint body having a cylindrical projection adapted to be inserted into a pipe to be connected; a ring member having a larger inner diameter than the outer diameter of the pipe; and a resiliently deformable, cylindrical sleeve member disposed between the ring member and the pipe, at least one of an inner surface of the ring member and an outer surface of the sleeve member being provided with a tapered portion, such that when one of the ring member and the sleeve member is slidingly moved, the sleeve member is deformed inward, resulting in tight connection of the inner surface of the pipe to the outer surface of the cylindrical projection; at least one of the ring member and the sleeve member having at least one portion engageable with the joint body, so that when the ring member, sleeve member, and joint body are assembled, the ring member and the sleeve member are locked to the assembled pipe joint.

One example of the first sleeve-type pipe joint of the present invention comprises a joint body having a cylindrical projection adapted to be inserted into a pipe to be connected; a high-rigidity ring member having a larger inner diameter than the outer diameter of the pipe and at least one portion engageable with the joint body; and a resiliently deformable, cylindrical sleeve member adapted to be pressed into a space between the ring member and the pipe, at least one of an inner surface of the ring member and an outer surface of the sleeve member being provided with a tapered portion, such that when the sleeve member is pressed into a space between the ring member and the pipe, the sleeve member is deformed inward, resulting in tight connection of the inner surface of the pipe to the outer surface of the cylindrical projection; wherein when the ring member, the sleeve member, and the joint body are assembled, the ring member and the sleeve member are locked to the assembled pipe joint.

Another example of the first sleeve-type pipe joint of the present invention comprises a joint body having a cylindrical projection adapted to be inserted into a pipe to be connected; a resiliently deformable, cylindrical sleeve member having at least one portion engageable with the joint body and a tapered portion on an outer surface; and a high-rigidity ring member adapted to be disposed on an outer surface of the sleeve member and having on an inner surface tapered portion engageable with the tapered portion of the sleeve member, wherein when the ring member is slidingly moved on the sleeve member toward a thicker region of the tapered portion of the sleeve member, the sleeve member is deformed inward, resulting in tight connection of the inner surface of the pipe to the outer surface of the cylindrical projection; and wherein when the ring member, the sleeve member, and the joint body are assembled, the ring member and the sleeve member are locked to the assembled pipe joint.

In the above two examples, the sleeve member preferably has a flange portion, which substantially abuts against a rear surface of the ring member when the connection of the sleeve-type pipe joint is completed. The sleeve member preferably has at least one projection on an outer surface for engaging the ring member when assembled.

A further example of the first sleeve-type pipe joint of the present invention comprises a joint body having a cylindrical projection adapted to be inserted into a pipe to be connected; a resiliently deformable, cylindrical sleeve member adapted to be abut against a pipe end-abutting surface of the joint body and having a tapered portion on an outer surface; and a high-rigidity ring member adapted to be disposed on an outer surface of the sleeve member and having at least one portion engageable with the joint body and a tapered portion on an inner surface, wherein when the ring member is slidingly moved on the sleeve member toward the joint body, the sleeve member is deformed inward, resulting in tight connection of the inner surface of the pipe to the outer surface of the cylindrical projection; and wherein when the ring member, the sleeve member, and the joint body are assembled, the ring member and the sleeve member are locked to the assembled pipe joint.

In a preferred embodiment, the sleeve member has at least one portion engageable with the ring member, such that both the ring member and the sleeve member resist detachment from the joint body in an assembled sleeve-type pipe joint.

The portion of the joint body with which the ring member or the sleeve member is engageable is preferably an annular groove, an annular projection or a plurality of annular ridges formed in a root portion of the cylindrical projection.

The sleeve member preferably has at least one longitudinal slit in a portion that shrinks in diameter by engagement with the ring member.

In another preferred embodiment, the sleeve member has a flange portion on the rear end side, which substantially abuts against a rear end surface of the ring member when the connection of the sleeve-type pipe joint is completed.

In a further preferred embodiment, the sleeve member has at least one projection on an outer surface, which is engageable with the engaging portion of the ring member to prevent the detachment of the sleeve member when assembled.

In a further preferred embodiment, the sleeve member has a plurality of projections extending forward from its front end, each of which has an outer projection in a tip end portion thereof, and the ring member has a plurality of longitudinal notches separated in a circumferential direction in a front portion thereof, whereby the outer projections of the sleeve member engage the rear end surfaces of the notches of the ring member to prevent the detachment of the sleeve member when assembled.

In a further preferred embodiment, the sleeve member has at least one projection on an outer surface thereof at a position at which the sleeve member does not engage the ring member in an assembled state of the sleeve-type pipe joint, and at which the ring member rides the sleeve member at the time of connection. This prevents the relative sliding movement of the ring member and the sleeve member in a longitudinal direction, by which the sleeve member shrinks in diameter, even when a smaller force than a predetermined level is exerted on the end surface of the sleeve member and/or the ring member before the cylindrical projection of the joint body is inserted into the pipe.

The second sleeve-type pipe joint of the present invention comprises a joint body having a cylindrical projection adapted to be inserted into a pipe to be connected; and a shrinkable member mounted onto an outer surface of the pipe; the shrinkable member comprising a resiliently deformable sleeve portion having a tapered portion on an outer surface, and a high-rigidity ring portion integrally connected to the sleeve portion via a thin portion; the relative movement of the sleeve portion and the ring portion toward each other causing the ring portion to no longer be integrally connected to the sleeve portion and seating the ring portion on the sleeve portion, whereby the sleeve portion is deformed inward, resulting in the tight connection of the inner surface of the pipe to the outer surface of the cylindrical projection.

One example of the second sleeve-type pipe joint of the present invention comprises a joint body having a cylindrical projection adapted to be inserted into a pipe to be connected; and a shrinkable member mounted onto an outer surface of the pipe; the shrinkable member comprising a resiliently deformable sleeve portion integrally having at least one portion engageable with the joint body, a flange portion and a shrinkable portion having a tapered outer surface in this order, with at least one slit extending longitudinally, and a high-rigidity ring portion integrally connected to a rear end of the sleeve portion via a thin portion; the sliding movement of the ring portion toward the joint body causing the ring portion to no longer be integrally connected to the sleeve portion and seating the ring portion on the sleeve portion, whereby the sleeve portion is deformed inward, resulting in the tight connection of the inner surface of the pipe to the outer surface of the cylindrical projection.

Another example of the second sleeve-type pipe joint of the present invention comprises a joint body having a cylindrical projection adapted to be inserted into a pipe to be connected and a flange portion extending near a root portion of the cylindrical projection; and a shrinkable member mounted onto an outer surface of the pipe; the shrinkable member comprising a resiliently deformable sleeve portion having a tapered outer surface with at least one slit extending longitudinally, and a high-rigidity ring portion integrally connected to a rear end of the sleeve portion via a thin portion; the sliding movement of the ring portion toward the joint body causing the ring portion to no longer be integrally connected to the sleeve portion and seating the ring portion on the sleeve portion, whereby the sleeve portion is deformed inward, resulting in the tight connection of the inner surface of the pipe to the outer surface of the cylindrical projection.

A further example of the second sleeve-type pipe joint of the present invention comprises a joint body having a cylindrical projection adapted to be inserted into a pipe to be connected; and a shrinkable member mounted onto an outer surface of the pipe; the shrinkable member comprising a high-rigidity ring portion, at least one portion engageable with the joint body, which integrally extends from a front end of the ring portion, and a resiliently deformable sleeve portion integrally connected to a rear end of the ring portion via a thin portion; the sleeve portion comprising a shrinkable portion having a tapered outer surface and a flange portion in this order from the side of the joint body with at least one slit extending longitudinally; the sliding movement of the sleeve portion toward the joint body causing the sleeve portion to no longer be integrally connected to a rear end of the ring portion and to enter into a space between the ring portion and the pipe, whereby the sleeve portion is deformed inward, resulting in the tight connection of the inner surface of the pipe to the outer surface of the cylindrical projection.

The above shrinkable member preferably has at least one portion engageable with the joint body. Also, the sleeve portion preferably has a flange portion. Further, the sleeve portion preferably has at least one slit extending longitudinally.

DESCRIPTION OF THE PREFERRED EMBODIMENTS

Figure 1A:
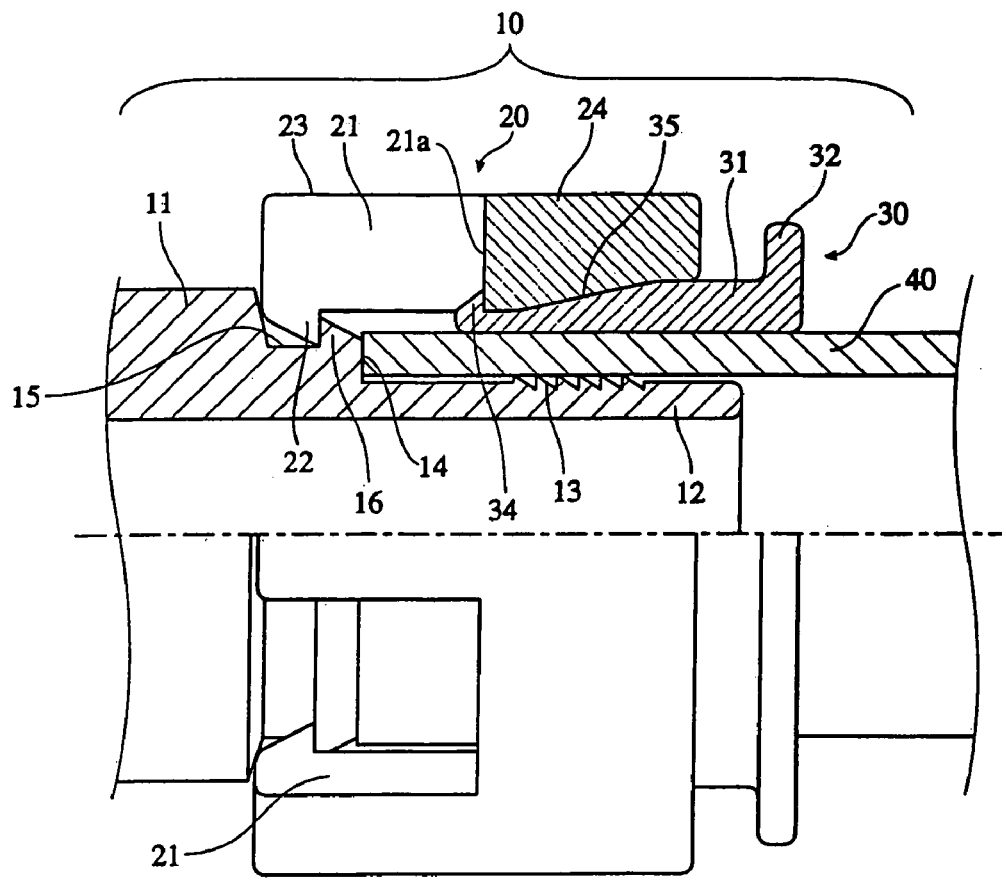
FIG. 1(a) is a partially cross-sectional side view showing an assembled, sleeve-type pipe joint according to the first embodiment of the present invention in a pre-connection state.

The sleeve-type pipe joint of each embodiment will be explained below referring to the drawings attached hereto. It should be noted that when reference numerals in each figure have the same numbers in the lowest two places, they show the same members or portions unless otherwise mentioned.

[1] First Embodiment

FIGS. 1–4 show a sleeve-type pipe joint according to the first embodiment of the present invention. FIG. 1(a) shows a state in which the assembled, sleeve-type pipe joint 10 is mounted onto the pipe 40, and FIG. 1(b) shows a state in which a part is separated. The pipe joint 10 comprises a joint body 11, a ring member 20 and a sleeve member 30.

The joint body 11 comprises a cylindrical projection 12 having a plurality of annular ridges 13 having a saw tooth cross section on an outer surface, which is inserted into the pipe 40, an annular projection 16 having a surface 14 against which the end of the pipe 40 abuts, and an annular groove 15 into which the engaging portion of the ring member 20 enters. The ring member 20 comprises a front portion 23 provided with a plurality of notches 21 separated in a circumferential direction, and a rear portion 24 having a rearward tapered portion 25 in an inner surface. The front portion 23 having notches 21 is provided with inner projections 22 engageable with the annular groove 15 of the joint body 11.

Figure 2:
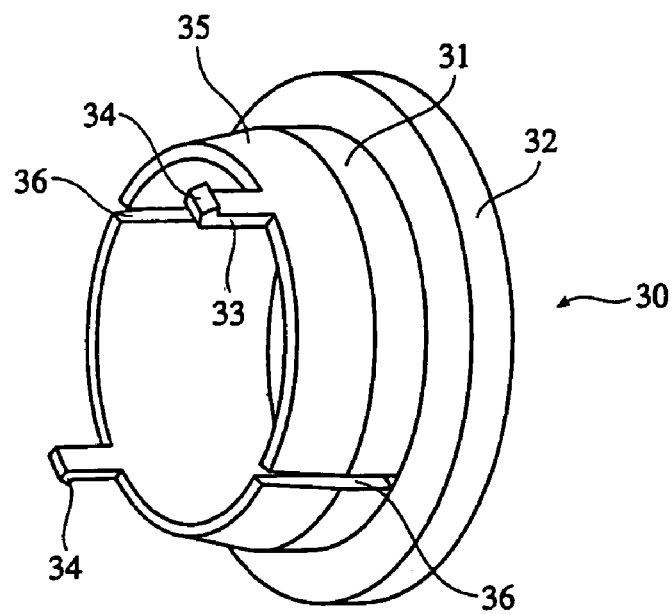
FIG. 2 is a perspective view showing a sleeve member used in the sleeve-type pipe joint of FIG. 1.

As shown in FIG. 2, the sleeve member 30 comprises a cylindrical body 31, a cylindrical tapered portion 35 extending from a front end of the cylindrical body 31, and a plurality of (two in the shown example) extensions 33 projecting from a front end of the cylindrical tapered portion 35. To fully exhibit the function of the sleeve-type pipe joint 10, the ring member 20 and the cylindrical projection 12 are higher in rigidity than the pipe 40 and the sleeve member 30. Therefore, the sleeve member 30 having the extensions 33 is provided with a plurality of (two in the shown example) slits 36 extending longitudinally in the cylindrical tapered portion 35 and the cylindrical body 31 at a circumferentially equal interval. Each extension 33 is provided at a tip end with an outer projection 34 engageable with a rear end surface 21a of each notch 21 of the ring member 20. The sleeve member 30 is provided with a flange portion 32 at a rear end.

Figure 1B:
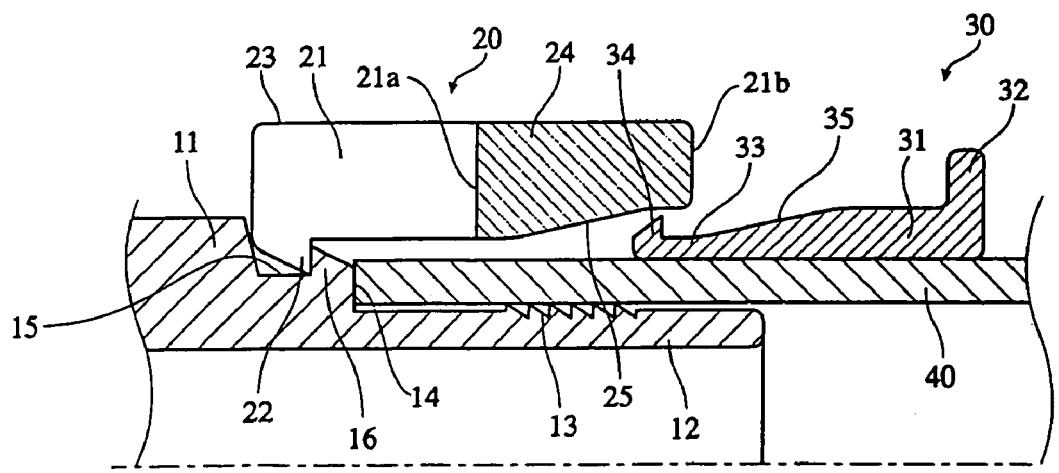
FIG. 1(b) is an exploded partial cross-sectional view showing the sleeve-type pipe joint of FIG. 1(a)

As shown in FIG. 1(b), in assembling the ring member 20 to the joint body 11, the inner projection 22 of the ring member 20 goes beyond a slanting surface of the annular projection 16 of the joint body 11 to engage the annular groove 15. As shown in FIG. 1(a), after assembling the sleeve member 30 to the ring member 20, the outer projection 34 of the sleeve member 30 engages the rear end surface 21a of the notch 21 of the ring member 20. The feature of the sleeve-type pipe joint 10 in this embodiment is that the ring member 20, sleeve member 30, and the joint body 11, when assembled resist detachment from the sleeve-type pipe joint 10 before either insertion of the pipe or connection.

They are not separated because they are kept together by engagement of the engaging portions such as the inner projection 22 of the ring member 20 and the outer projection 34 of the sleeve member 30.

Figure 3:
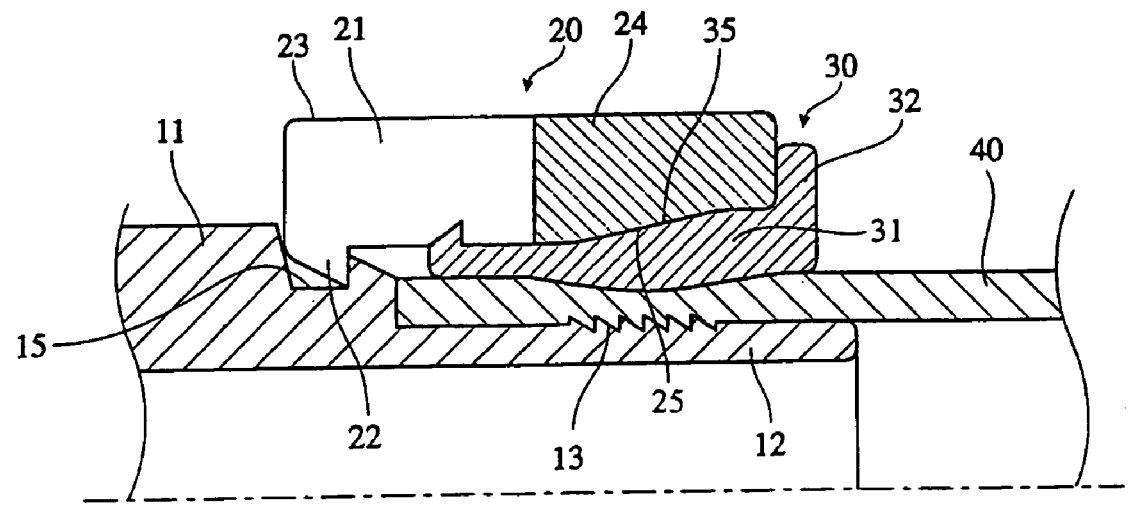
FIG. 3 is a partial cross-sectional view showing the sleeve-type pipe joint of FIG. 1 in a state in which connection to the pipe is completed.
Figure 4:
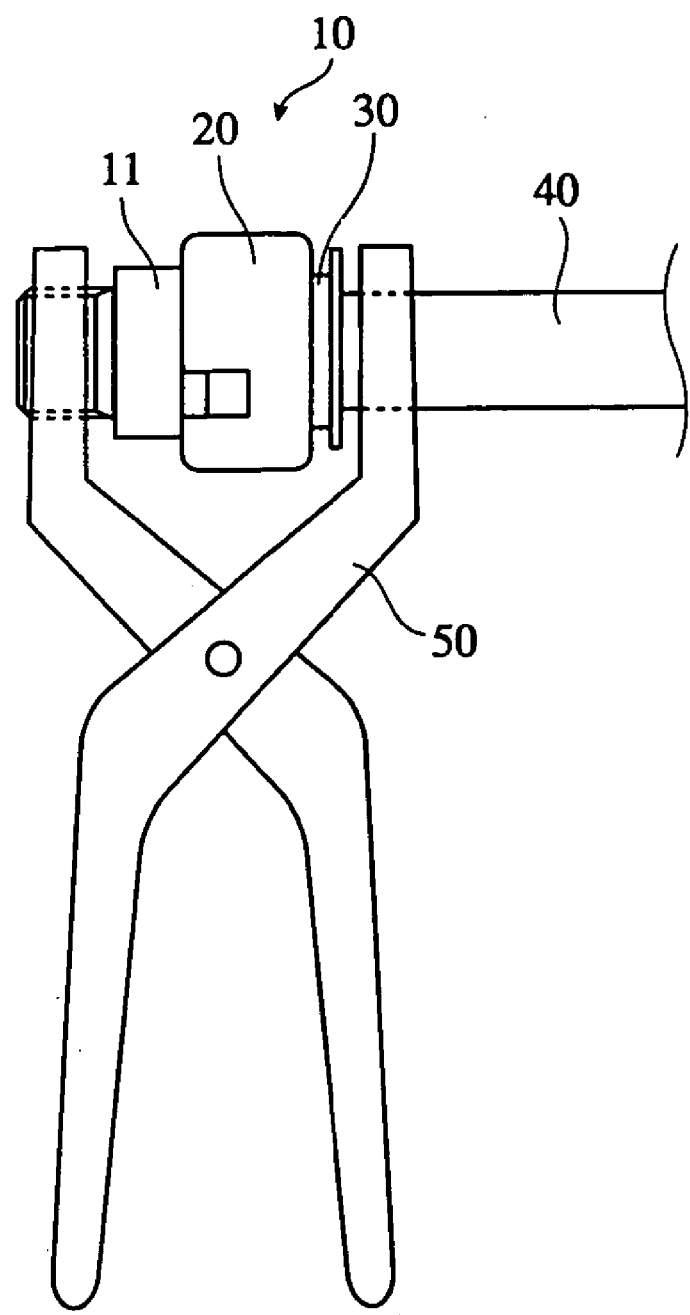
FIG. 4 is a side view showing a tool for connecting the sleeve-type pipe joint of the first embodiment.

The pipe 40 can be inserted into the annular space in-between sleeve member 30 and cylindrical projection 12 created after assembly of the sleeve-type pipe joint 10. As shown in FIG. 4, when the sleeve member 30 is pushed forward into the ring member 20 by a manual tool 50, the tapered portion 35 of the sleeve member 30 is pressed onto the tapered portion 25 of the ring member 20 as shown in FIG. 3. Because the ring member 20 has higher rigidity than that of the sleeve member 30 having slits 36, the cylindrical tapered portion, 35 and the cylindrical body 31 of the sleeve member 30 shrink in diameter. As a result, the pipe 40 is deformed inward so that the inner surface of the pipe 40 is pressed onto the outer surface of the cylindrical projection 12 of the joint body 11. Because the outer surface of the cylindrical projection 12 is provided with a plurality of annular ridges 13, which bite into the inner surface of the pipe 40, the pipe 40 is prevented from being detached from the pipe joint 10 and is completely sealed to the cylindrical projection 12 of the joint body 11. Though a manual tool 50 is shown in FIG. 4, an electric or hydraulic tool may be used for connecting the sleeve-type pipe joint 10 of the present invention.

FIG. 3 shows a state in which the sleeve-type pipe joint 10 is completely connected to the pipe 40. Because the inner projection 22 of the ring member 20 continues to engage the annular groove 15 of the joint body 11 in this state, the ring member 20 resists detachment from the joint body 11. Because the parts of the assembled, sleeve-type, pipe joint 10 are not separated, the connection of the sleeve-type pipe joint 10 to the pipe 40 can be achieved simply by inserting the pipe 40 into the annular space in-between sleeve member 30 and cylindrical projection 12, and pushing the sleeve member 30 forward into the ring member 20 with a tool 50. Accordingly, it is possible to assemble the parts before a plumber uses them, reducing the chance of incorrect assembly.

Whether or not the pipe 40 has surely been inserted into the sleeve-type pipe joint 10 is confirmed by whether or not the end of the pipe 40 abuts against the pipe end-abutting surface 14 of the joint body 11. This confirmation can be carried out by observation from outside by the naked eye through the notches 21 of the ring member 20. Also, the completion of the pushing operation of the sleeve member 30 can be confirmed by the fact that the flange portion 32 of the sleeve member 30 abuts against the rear end surface 21b of the ring member 20.

[2] Second Embodiment

Figure 5A:
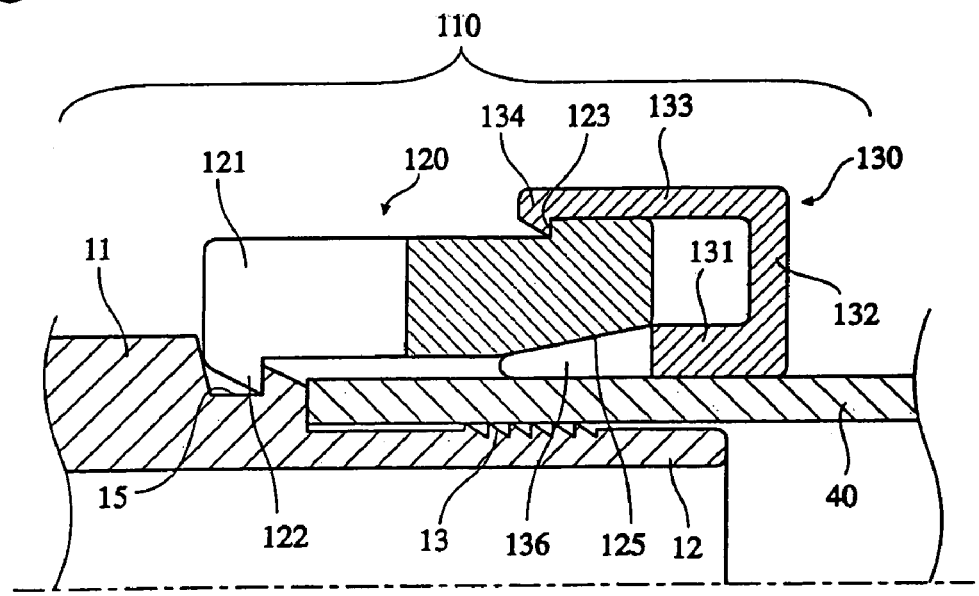
FIG. 5(a) is a partially cross-sectional side view showing an assembled, sleeve-type pipe joint according to the second embodiment of the present invention in a pre-connection state.
Figure 5B:
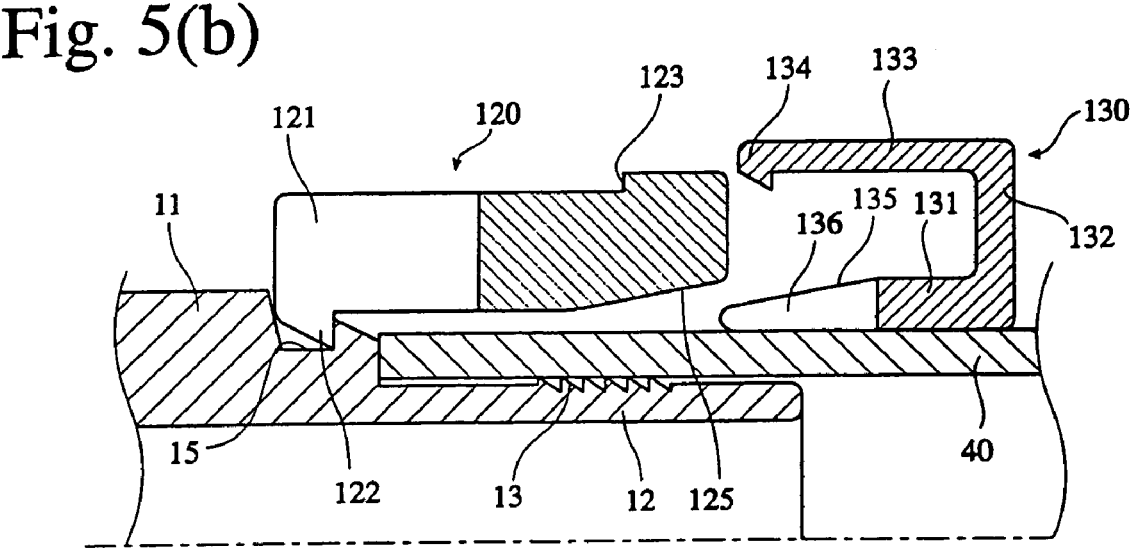
FIG. 5(b) is an exploded partial cross-sectional view showing the sleeve-type pipe joint of FIG. 5(a)
Figure 6:
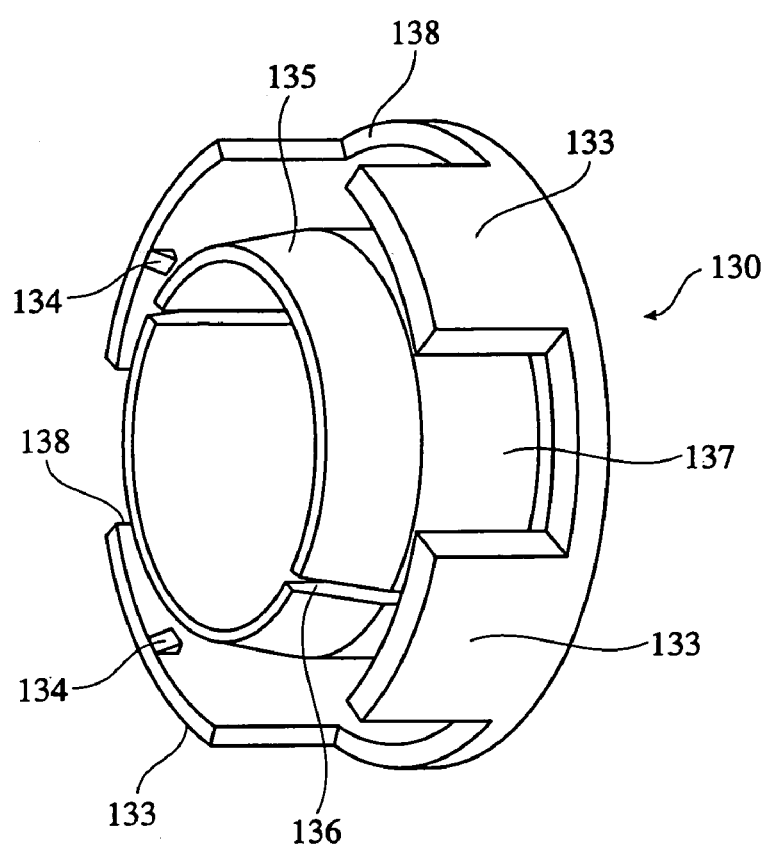
FIG. 6 is a perspective view showing a sleeve member used in the sleeve-type pipe joint of FIG. 5.

The sleeve-type pipe joint 110 according to the second embodiment of the present invention shown in FIGS. 5 and 6 is different from that of the first embodiment mainly in the structure of a sleeve member 130. Specifically, the sleeve member 130 has a double-cylinder structure in which an inner cylindrical portion 131 is integrally connected to an outer cylindrical portion 133 via a rear end portion 132. As in the first embodiment, the inner cylindrical portion 131 comprises a cylindrical body 137, and a cylindrical tapered portion 135 extending from a front end of the cylindrical body 137, with a plurality of (two in the shown example) slits 136 longitudinally extending in the cylindrical tapered portion 135 and the cylindrical body 137. The outer cylindrical portion 133 comprises a plurality of notches 138 and inner projections 134 provided at a tip inner end of each remaining section. The inner projection 134 is engageable with the step 123 of the ring member 120. The ring member 120 differs from that in the sleeve-type pipe joint of the first embodiment in that it has on an outer surface a step 123 engageable with the inner projection 134 of the sleeve member 130.

As shown in FIG. 5, the ring member 120 is mounted onto the joint body 11, while the sleeve member 130 is mounted onto a rear end of the ring member 120. In this assembled state, because the inner projection 122 of the ring member 120 engages the annular groove 15 of the joint body 11, and because the inner projection 134 of the sleeve member 130 engages the step 123 of the ring member 120, the ring member 120 and the sleeve member 130 resist detachment from the assembled pipe joint 110.

After insertion of the pipe 40, the ring member 120 is pressed into the sleeve member 130 by a tool 50, so that the tapered portion 135 of the sleeve member 130 is pressed onto the tapered portion 125 of the ring member 120. Because the ring member 120 is higher in rigidity than the inner cylindrical portion 131 of the sleeve member 130 having slits 136, the cylindrical tapered portion 135 and the cylindrical body 137 of the sleeve member 130 are caused to shrink, resulting in the inward deformation of the pipe 40. As a result, the annular ridges 13 on the outer surface of the cylindrical projection 12 bite into the inner surface of the pipe 40, so that the pipe 40 is prevented from detaching and is completely sealed.

[3] Third Embodiment

Figure 7:
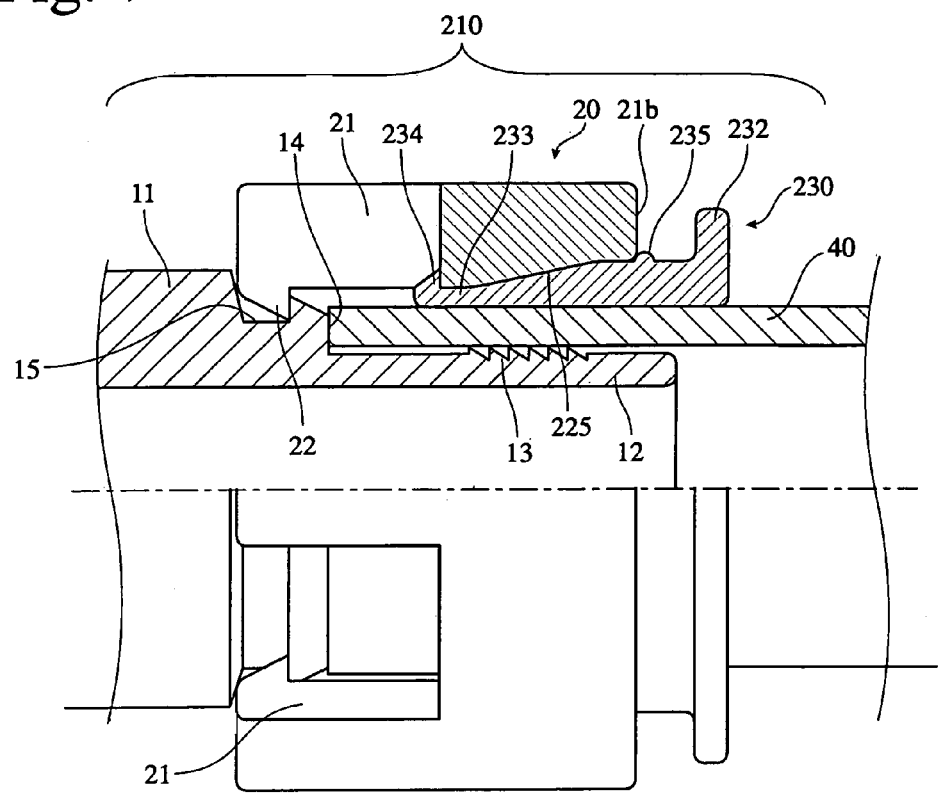
FIG. 7 is a partially cross-sectional side view showing an assembled, sleeve-type pipe joint according to the third embodiment of the present invention in a pre-connection state.

The sleeve-type pipe joint 210 according to the third embodiment of the present invention shown in FIG. 7 is different from the sleeve-type pipe joint 10 of the first embodiment in that a sleeve member 230 is provided with an outward projection 235 on an outer surface. With this structure, the sleeve-type pipe joint 210 can be conveyed to a piping site with each part assembled. Also, because an outer projection 235 of the sleeve member 230 abuts against the rear end surface 21b of the notch 21 of the ring member 20, the sleeve member 230 will not enter into the ring member 20, if a modestly small force were to be applied externally to the sleeve member 230 during conveyance in such a direction that it is pushed inward the ring member 20. This projection assists in avoiding the unintentional shrinking of the sleeve member 230.

To push the sleeve member 230 forward into the ring member 20, the required thrust force is about 80–100 kgf (784–980 N) for a resin pipe of 10–25 mm in outer diameter. Accordingly, it is preferable to provide a manual tool with a booster. Incidentally, instead of providing the sleeve member 230 with the outer projection 235 as in the present embodiment, the angle of the tapered surface 225 of the ring member 20 or the rigidity of the sleeve member 230 may be properly adjusted, such that a modestly small external force does not cause the sleeve member 230 to enter into the ring member 20, assisting in avoiding unintentional shrinkage in diameter. This prevents the inconvenience that a slightly shrunken sleeve member 230 presents to inserting the pipe 40 into the pipe joint 210.

[4] Fourth Embodiment

Figure 8:
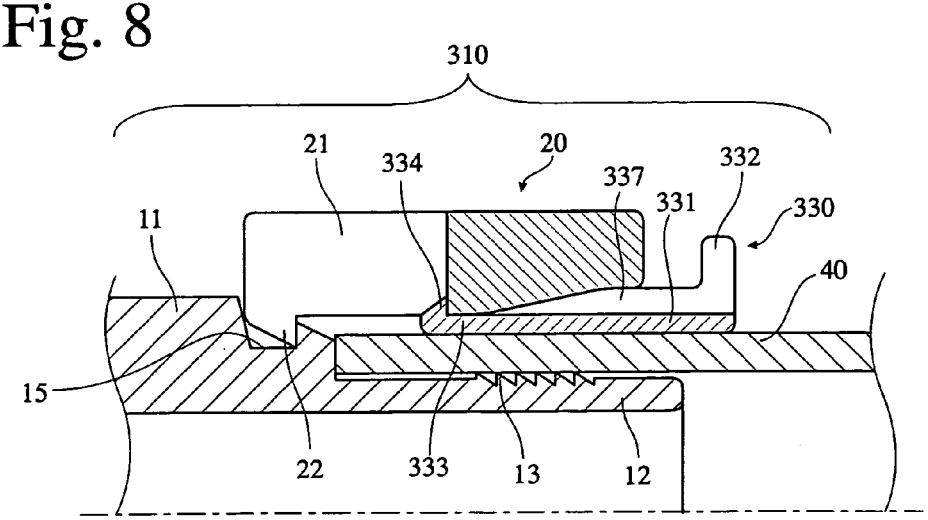
FIG. 8 is a partial cross-sectional view showing an assembled, sleeve-type pipe joint according to the fourth embodiment of the present invention in a pre-connection state.
Figure 9:
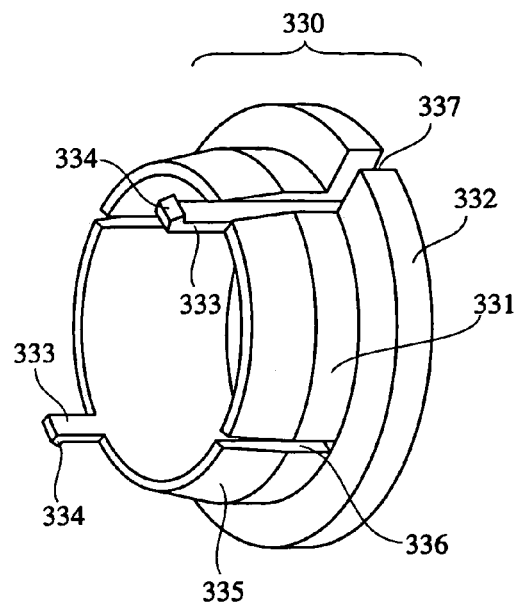
FIG. 9 is a perspective view showing a sleeve member used in the sleeve-type pipe joint of FIG. 8.

The sleeve-type pipe joint 310 according to the fourth embodiment of the present invention shown in FIGS. 8 and 9 is different from the sleeve-type pipe joint 10 of the first embodiment in that a sleeve member 330 is provided on an outer surface with grooves 337 each longitudinally extending to an outer projection 334. With this structure, in the resin injection molding of the sleeve member 330, a molding can be withdrawn longitudinally from the side of the outer projection 334, making it unnecessary to use die parts slidable in perpendicular to the opening direction of the die. This makes the structure of the die simple, and makes it possible to mold a large number of products at the same time in a single die, resulting in higher productivity in injection molding.

[5] Fifth Embodiment

Figure 10:
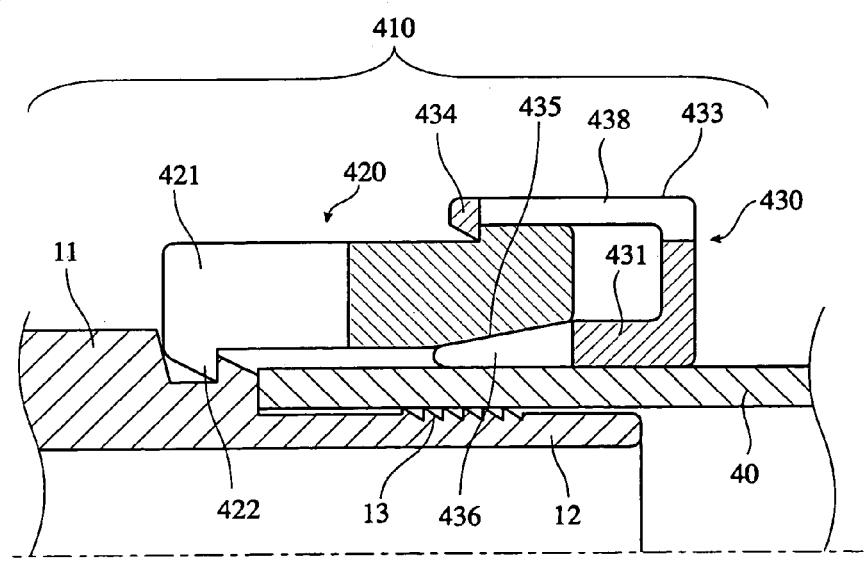
FIG. 10 is a partial cross-sectional view showing an assembled, sleeve-type pipe joint according to the fifth embodiment of the present invention in a pre-connection state.
Figure 11:
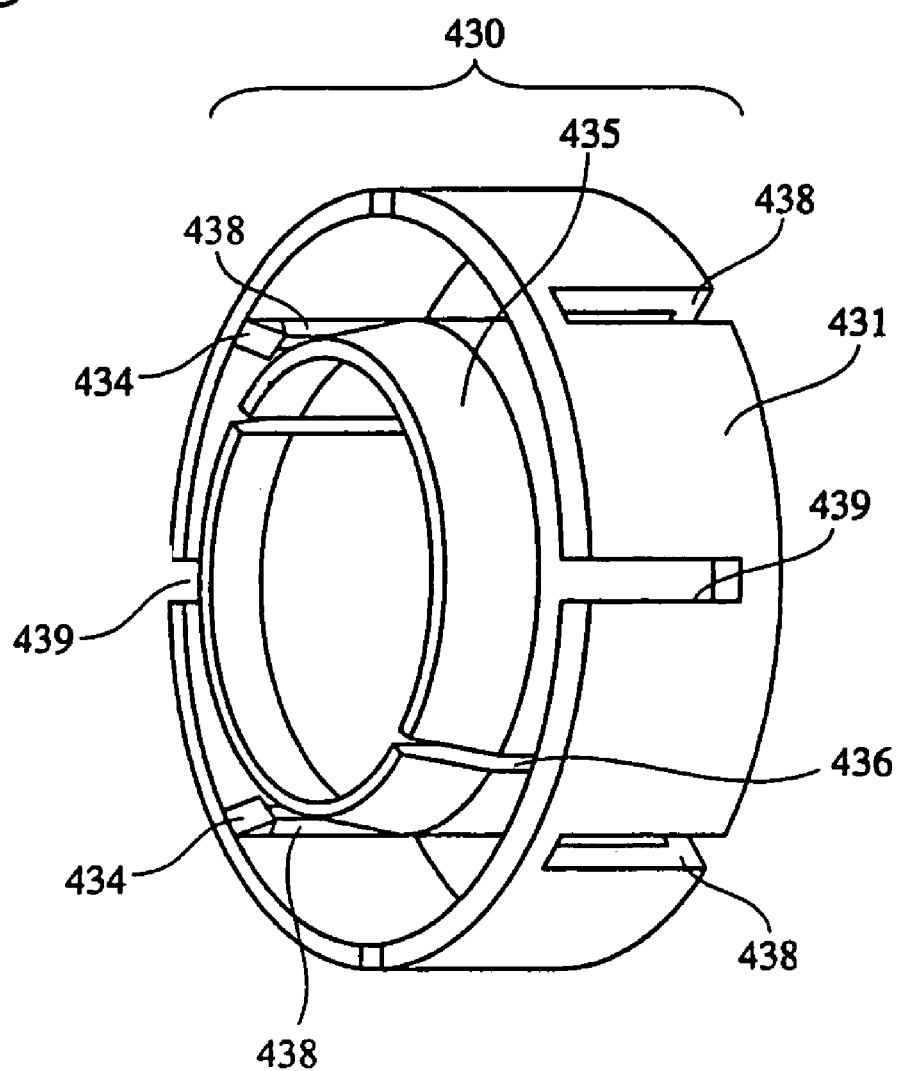
FIG. 11 is a perspective view showing a sleeve member used in the sleeve-type pipe joint of FIG. 10.

The sleeve-type pipe joint 410 according to the fifth embodiment of the present invention shown in FIGS. 10 and 11 is different from the sleeve-type pipe joint 110 of the second embodiment shown in FIGS. 5 and 6, in that an outer cylindrical portion 433 of a sleeve member 430 is provided with notches 438 longitudinally extending at the same circumferential positions as inner projections 434 at a tip end. Provided at circumferential positions between the adjacent notches 438, 438 are notches 439 extending longitudinally in the sleeve member 430. Each notch 438 opens at a rear end of the sleeve member 430, while each notch 439 opens at a front end of the sleeve member 430. With this structure, moldings can easily be withdrawn simply by opening the die longitudinally as in the sleeve member 330 shown in FIG. 9, resulting in providing the die with a simple structure and capability of forming a large number of products at the same time.

[6] Sixth Embodiment

Figure 12:
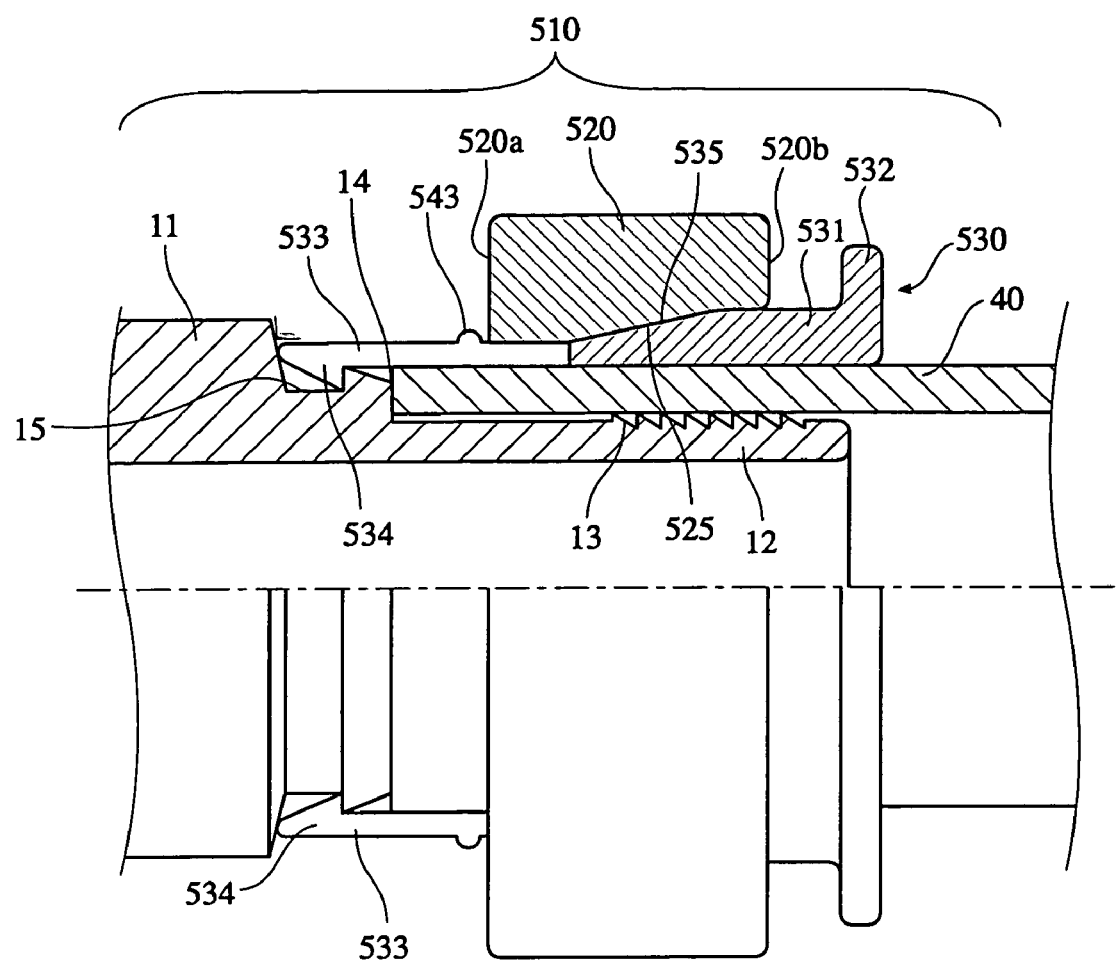
FIG. 12 is a partially cross-sectional side view showing an assembled, sleeve-type pipe joint according to the sixth embodiment of the present invention in a pre-connection state.
Figure 13:
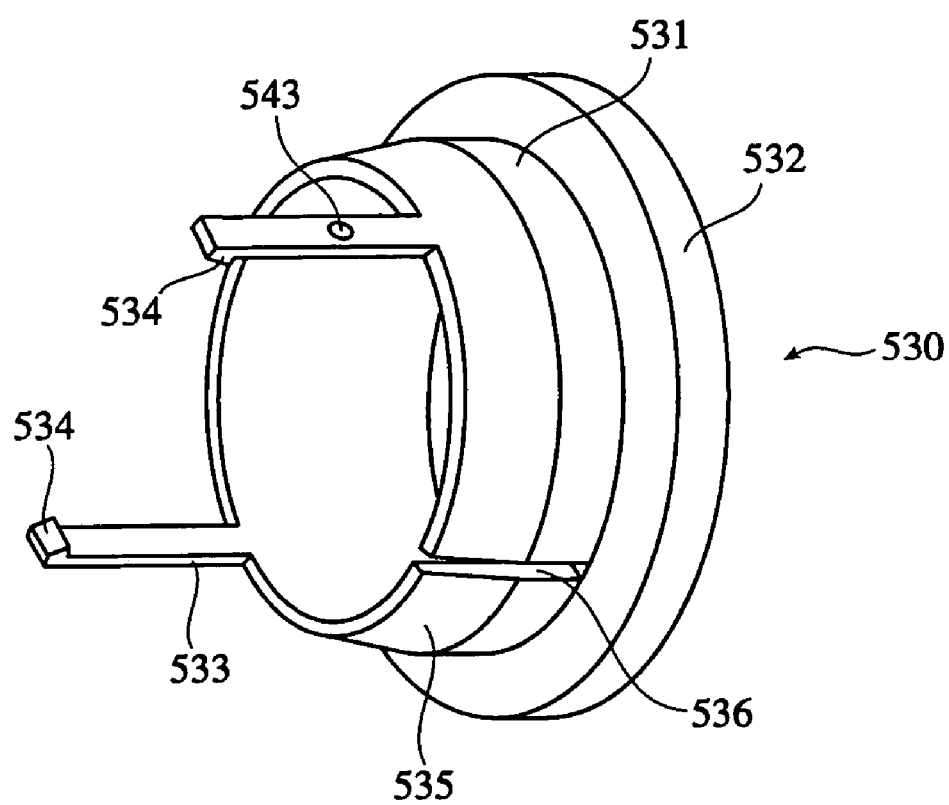
FIG. 13 is a perspective view showing a sleeve member used in the sleeve-type pipe joint of FIG. 12.

The sleeve-type pipe joint 510 according to the sixth embodiment of the present invention shown in FIG. 12 comprises a sleeve member 530 having a similar shape to that of the sleeve member 30 shown in FIGS. 1–3, with differences that (a) extensions 533 of the sleeve member 530 are so long that they reach the annular groove 15 of the joint body 11; (b) projections 534 provided at tip ends of the extensions 533 protrude inward and engage the annular groove 15; and (c) the extensions 533 are provided with projections 543 on their outer surfaces. A ring member 520 in the sleeve-type pipe joint 510 of the present embodiment is in a relatively narrow ring shape without slits 21 as seen in the first embodiment.

With this structure, in an assembled state, the inner projection 534 of the sleeve member 530 engages the annular groove 15 of the joint body 11, and a front-end surface 520a of the ring member 520 engages the projections 543 of the extensions 533. Thus, the ring member 520 and the sleeve member 530 resist detachment from the assembled pipe joint 510.

Figure 14:
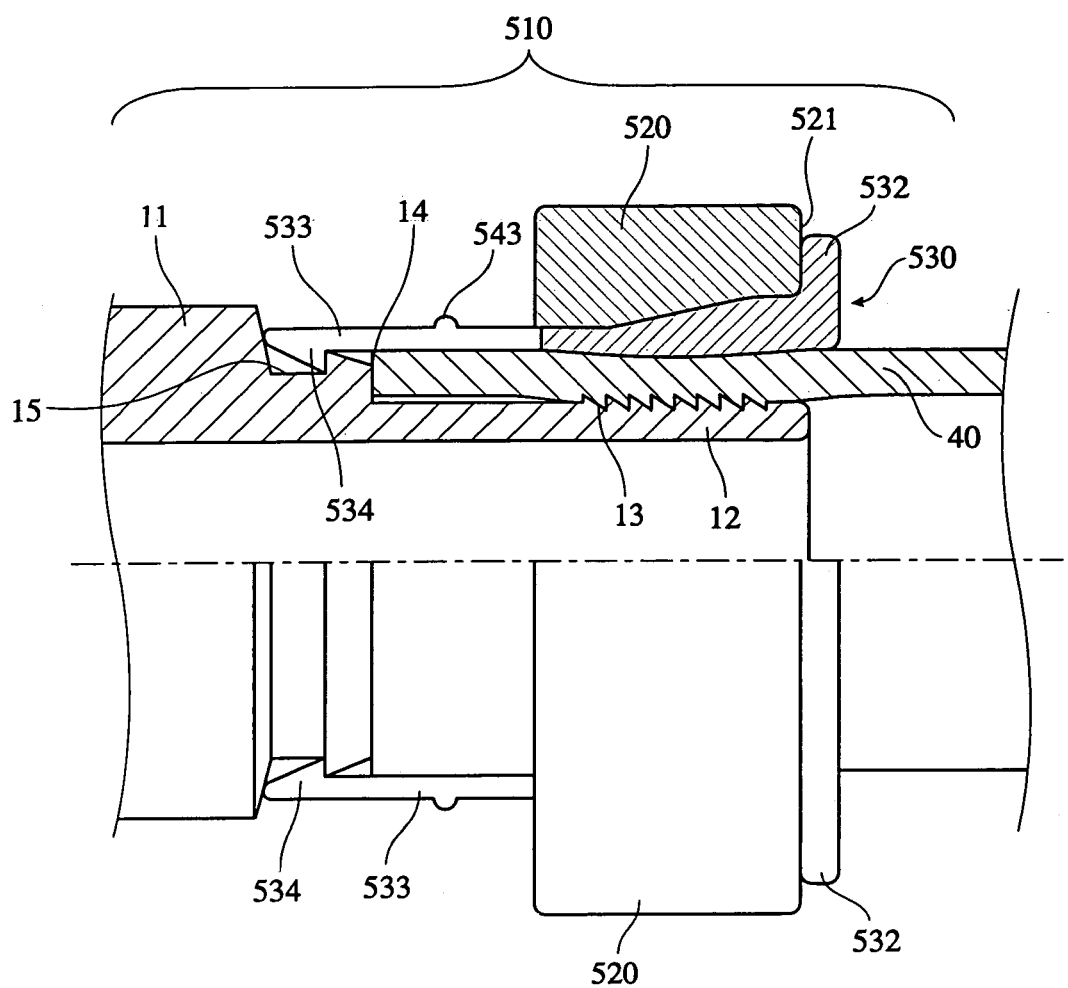
FIG. 14 is a partially cross-sectional side view showing the sleeve-type pipe joint of FIG. 12 in a state in which connection to the pipe is completed.

After the insertion of the pipe 40 between the cylindrical projection 12 of the joint body 11 and the sleeve member 530, as the ring member 520 is moved toward the rear end of the sleeve member 530 until it abuts a flange portion 532, the inner tapered portion 525 of the ring member 520 is brought into contact with the outer tapered portion 535 of the sleeve member 530, such that the sleeve member 530 is pressed inward, resulting in reduction in diameter as shown in FIG. 14. Thus, the annular ridges 13 on an outer surface of the cylindrical projection 12 bite into the inner surface of the pipe 40, preventing the pipe from detaching and forming a complete seal.

The feature of this embodiment is that the sleeve member 530 does not move relative to the pipe 40 at the time of connection. Therefore, when the ring member 520 is slidingly moved with a tool, etc., for connection, no friction resistance is generated between the outer surface of the pipe 40 and the inner surface of the sleeve member 530, but only between the outer surface of the sleeve member 530 and the inner surface of the ring member 520. Thus, a thrust force necessary for moving the ring member 520 can be made small. Also, because the sleeve member 530 may be provided with properly reduced rigidity through slits 536 formed in a front portion thereof making the shrinkage of the sleeve member 530 easier, a thrust force necessary for slidingly moving the ring member 520 at the time of connection of the pipe 40 can be made properly small.

[7] Seventh Embodiment

Figure 15:
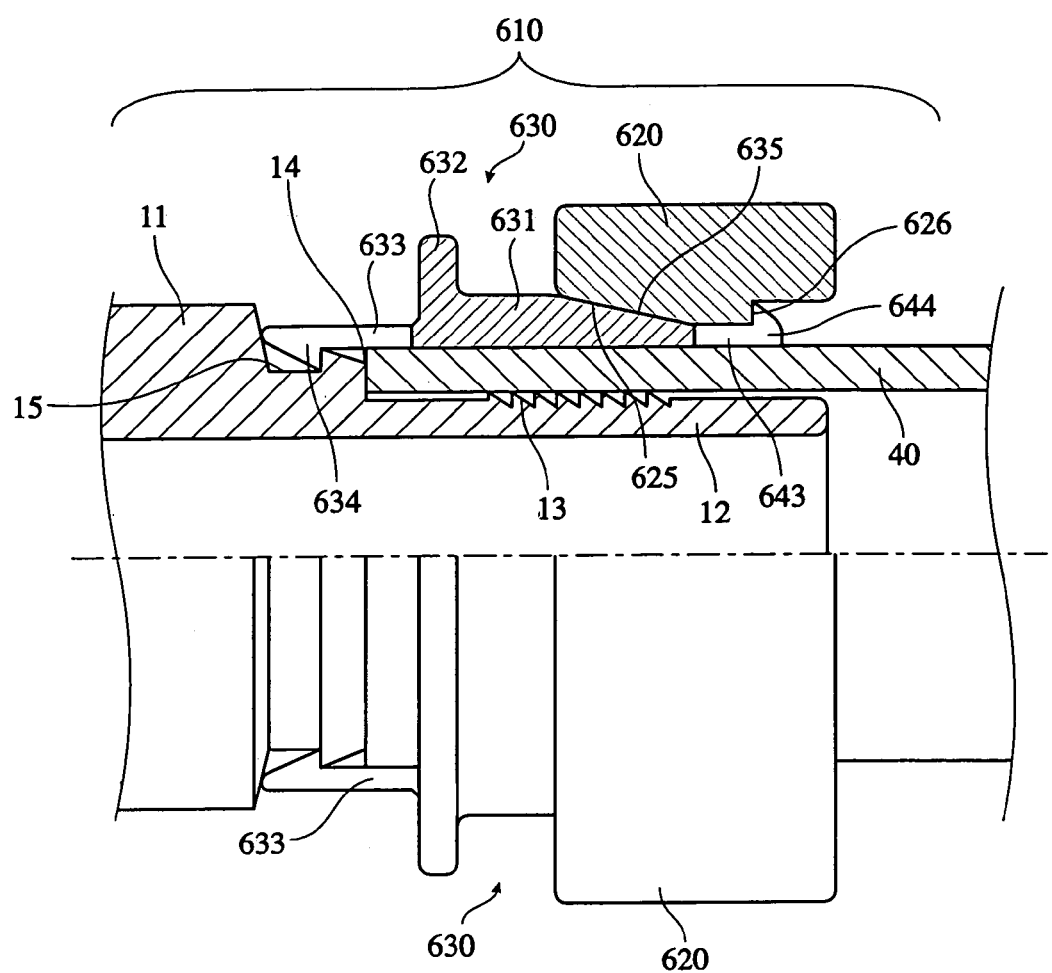
FIG. 15 is a partially cross sectional side view showing an assembled, sleeve-type pipe joint according to the seventh embodiment of the present invention in a pre-connection state.

A sleeve member 630 in the sleeve-type pipe joint 610 according to the seventh embodiment of the present invention shown in FIG. 15 comprises a cylindrical body 631, a flange portion 632 integrally provided at a front end of the cylindrical body 631, a projection 633 extending forward from a front end of the flange portion 632, an inner projection 634 provided at a tip end of the projection 633, a tapered portion 635 integrally connected to a rear end of the cylindrical body 631, projection 643 extending rearward from a rear end of the tapered portion 635, and an outer projection 644 provided at a tip end of the projection 643. The ring member 620 comprises, on an inner surface, a tapered portion 625 brought into slidable contact with the tapered portion 635 of the sleeve member 630, and a step 626 engageable with the outer projection 644. As shown in FIG. 15, after the sleeve member 630, the ring member 620 and the joint body 11 are assembled, the inner projection 634 of the sleeve member 630 engages the annular groove 15 of the joint body 11, while the step 626 of the ring member 620 engages the outer projection 644 of the sleeve member 630. Thus the sleeve member 630 and the ring member 620 resist detaching from the assembled pipe joint 610.

To connect the sleeve-type pipe joint 610 to the pipe 40, the pipe 40 is first inserted between the cylindrical projection 12 of the joint body 11 and the sleeve member 630, after the sleeve member 630, the ring member 620 and the joint body 11 have been assembled as shown in FIG. 15. Next, the ring member 620 is slid toward the joint body 11 by a tool to have both tapered portions 625, 635 to engage each other, thereby shrinking the sleeve member 630 in diameter. In this embodiment, too, because the sleeve member 630 does not slide on the pipe 40, no friction resistance is generated on the outer surface of the pipe 40, whereby the connection of the sleeve-type pipe joint 610 can be easily achieved.

[8] Eighth Embodiment

Figure 16:
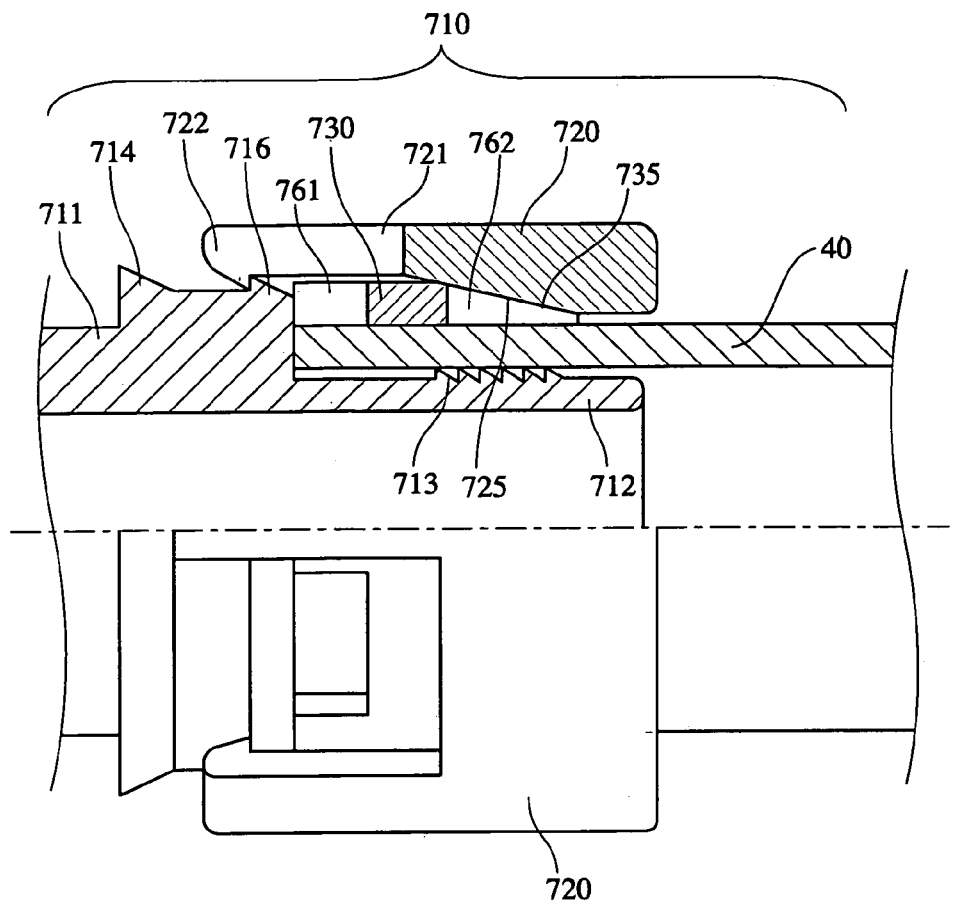
FIG. 16 is a partially cross-sectional side view showing an assembled, sleeve-type pipe joint according to the eighth embodiment of the present invention in a pre-connection state.
Figure 17:
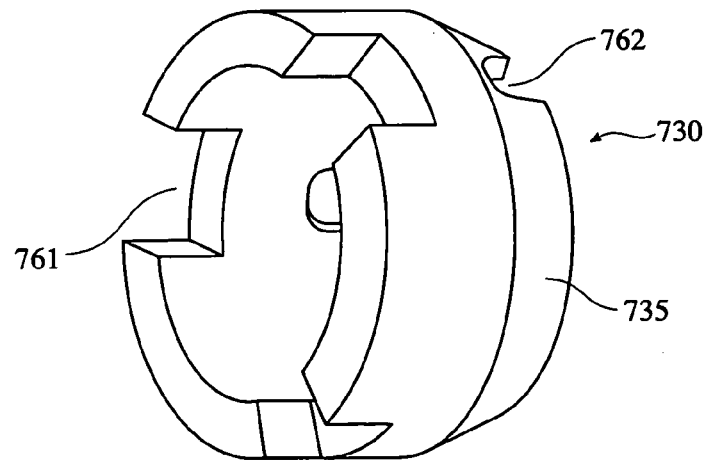
FIG. 17 is a perspective view showing a sleeve member used in the sleeve-type pipe joint of FIG. 16.
Figure 18:
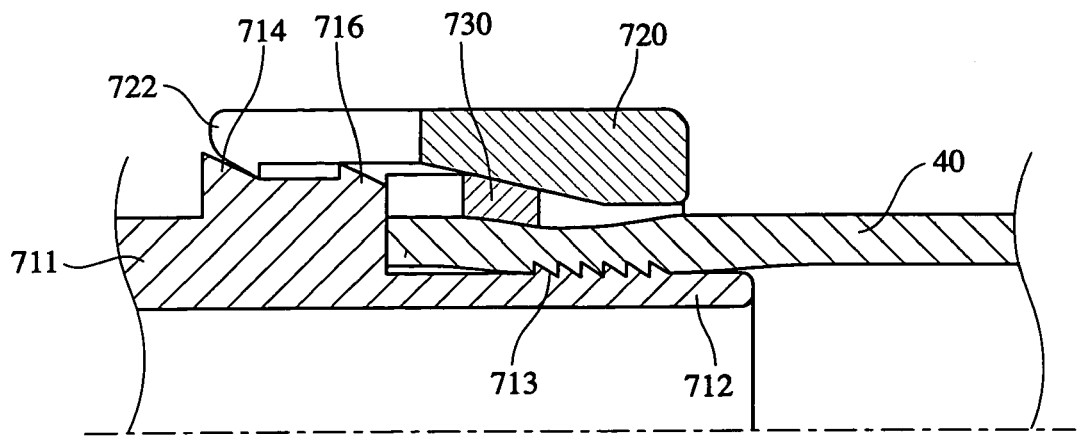
FIG. 18 is a partial cross-sectional view showing the sleeve-type pipe joint of FIG. 16 in a state in which connection to the pipe is completed.

The sleeve-type pipe joint 710 according to the eighth embodiment of the present invention shown in FIGS. 16–18 comprises (a) a joint body 711 comprising a first annular projection 714 having a rearward slanting surface, a second annular projection 716 having a rearward slanting surface, and a cylindrical projection 712 having a plurality of annular ridges 713 on an outer surface; (b) a ring member 720 comprising a tapered portion 725 on an inner surface, an inner projection 722 on a tip end, and a plurality of notches 721 substantially at a front end; and (c) a sleeve member 730 comprising a tapered portion 735 on an outer surface on the rear side, with notches 761, 762 provided on front and rear sides.

FIG. 17 shows the overall appearance of the sleeve member 730. The notches 761 on the larger-diameter front side have a function as windows for confirming the insertion of the pipe 40, while the notches 762 on the smaller-diameter rear side function to reduce rigidity so that the sleeve member 730 easily shrinks in diameter.

When the ring member 720 is mounted onto the joint body 711 with the sleeve member 730 assembled in the ring member 720, the inner projection 722 of the ring member 720 engages the second annular projection 716 of the joint body 711, so that the ring member 720 and the sleeve member 730 resist detachment from the assembled pipe joint 710.

When the ring member 720 is slidingly moved with a tool, etc., the inner tapered portion 725 of the ring member 720 is brought into slidable contact with the outer tapered portion 735 of the sleeve member 730, and the sleeve member 730 shrinks in diameter, thereby deforming the pipe 40 inward. As a result, the annular ridges 713 on the outer surface of the cylindrical projection 712 of the joint body 711 bite into the inner surface of the pipe 40, surely both preventing the pipe 40 from detaching and forming a full seal. FIG. 18 shows a state where the ring member 720 has been slidingly moved until a front end of the ring member 720 abuts against the slanting surface of the first annular projection 714 of the joint body 711. By observing by the naked eye whether or not the tip end of the ring member 720 has abutted against the slanting surface of the first annular projection 714 of the joint body 711, the completion of connecting the sleeve-type pipe joint 710 to the pipe 40 can easily be confirmed. Alternatively, when the sliding of the ring member 720 has been completed, the inner projection 722 of the ring member 720 may cross the slanting surface of the annular projection 714 of the joint body 711, resulting in engagement with the annular projection 714.

In this embodiment, too, because the sleeve member 730 does not slide on the pipe 40, no friction resistance is generated on the outer surface of the pipe 40, resulting in easy connection of the sleeve-type pipe joint 710.

[9] Ninth Embodiment

Figure 19:
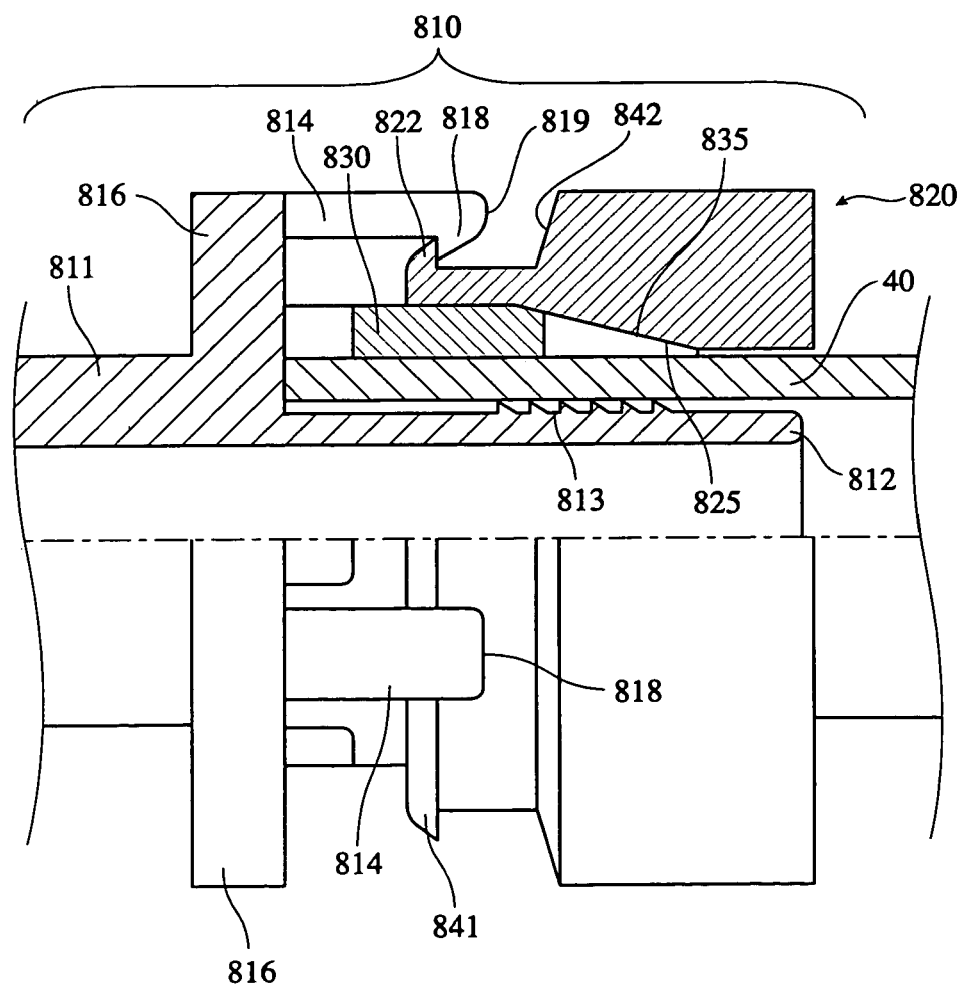
FIG. 19 is a partially cross-sectional side view showing an assembled, sleeve-type pipe joint according to the ninth embodiment of the present invention in a pre-connection state.
Figure 20:
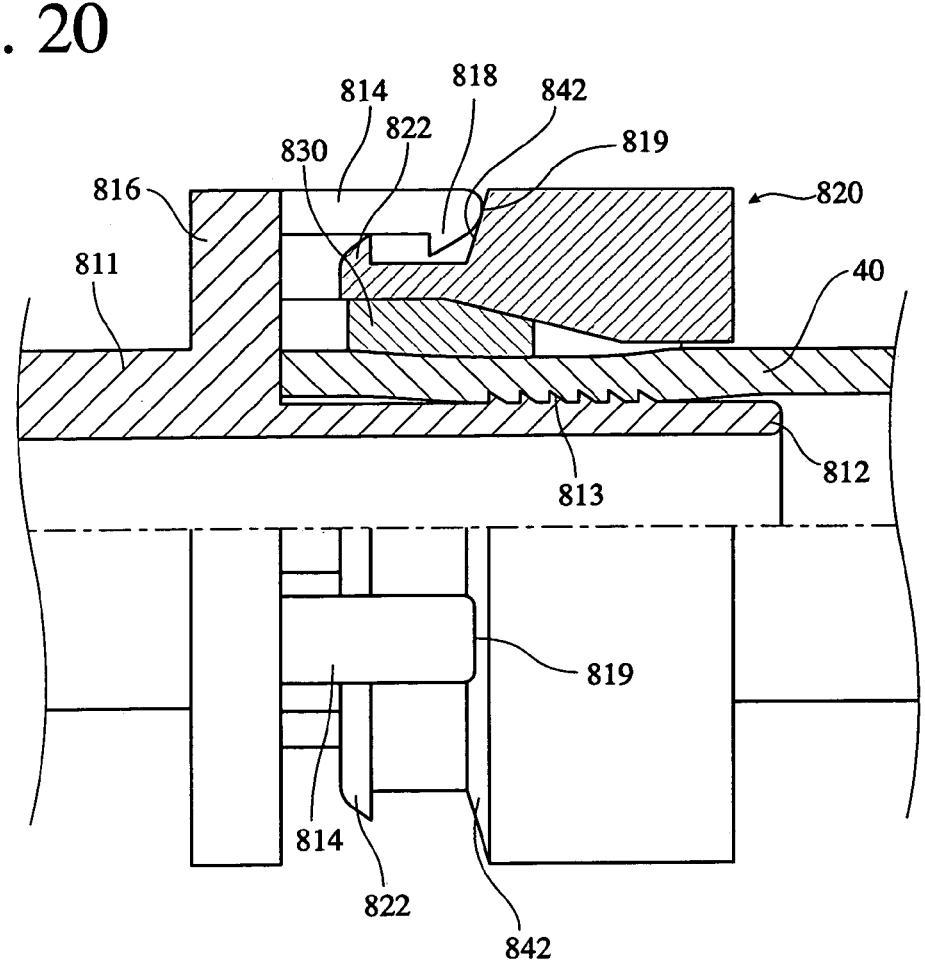
FIG. 20 is a partially cross-sectional side view showing the sleeve-type pipe joint of FIG. 19 in a state in which connection to the pipe is completed.

FIGS. 19 and 20 show a sleeve-type pipe joint 810 according to the ninth embodiment of the present invention. In this embodiment, a joint body 811 comprises a flange portion 816 in a root portion of a cylindrical projection 812, and a plurality of projections 814 integrally extending from a rear end of the flange portion 816, with an inner projection 818 provided at a tip end of each projection 814. A ring member 820 comprises an outer projection 822 at a tip end, which is engageable with an inner projection 818 of the joint body 811. Incidentally, the shape of a sleeve member 830 is essentially the same as that of the sleeve member 730 according to the eighth embodiment shown in FIGS. 16–18.

When the ring member 820 is assembled to the joint body 811 with the sleeve member 830 inserted into the ring member 820, the outer projection 822 of the ring member 820 engages the inner projection 818 of the joint body 811, so that the ring member 820 and the sleeve member 830 resist detachment from the assembled pipe joint 810.

When the ring member 820 is slidingly moved with a tool, etc., the inner tapered portion 825 of the ring member 820 is brought into slidable contact with the outer tapered portion 835 of the sleeve member 830, and the sleeve member 830 shrinks in diameter, thereby deforming the pipe 40 inward. As a result, the annular ridges 813 on the outer surface of the cylindrical projection 812 of the joint body 811 bite into the inner surface of the pipe 40, surely both preventing the pipe 40 from withdrawing and forming a full seal. FIG. 20 shows a state where the connection of the ring member 820 has been completed. In this state, the projection 814 of the joint body 811 abuts against the front-end surface 842 of the ring member 820. By observing by the naked eye whether or not the tip end 819 of the projection 814 of the joint body 811 has abutted against the ring member 820, the completion of connecting the sleeve-type pipe joint 810 to the pipe 40 can easily be confirmed. In this embodiment, too, because the sleeve member 830 does not slide on the pipe 40, no friction resistance is generated on the outer surface of the pipe 40, resulting in easy connection of the sleeve-type pipe joint 810.

[10] Tenth Embodiment

Figure 21:
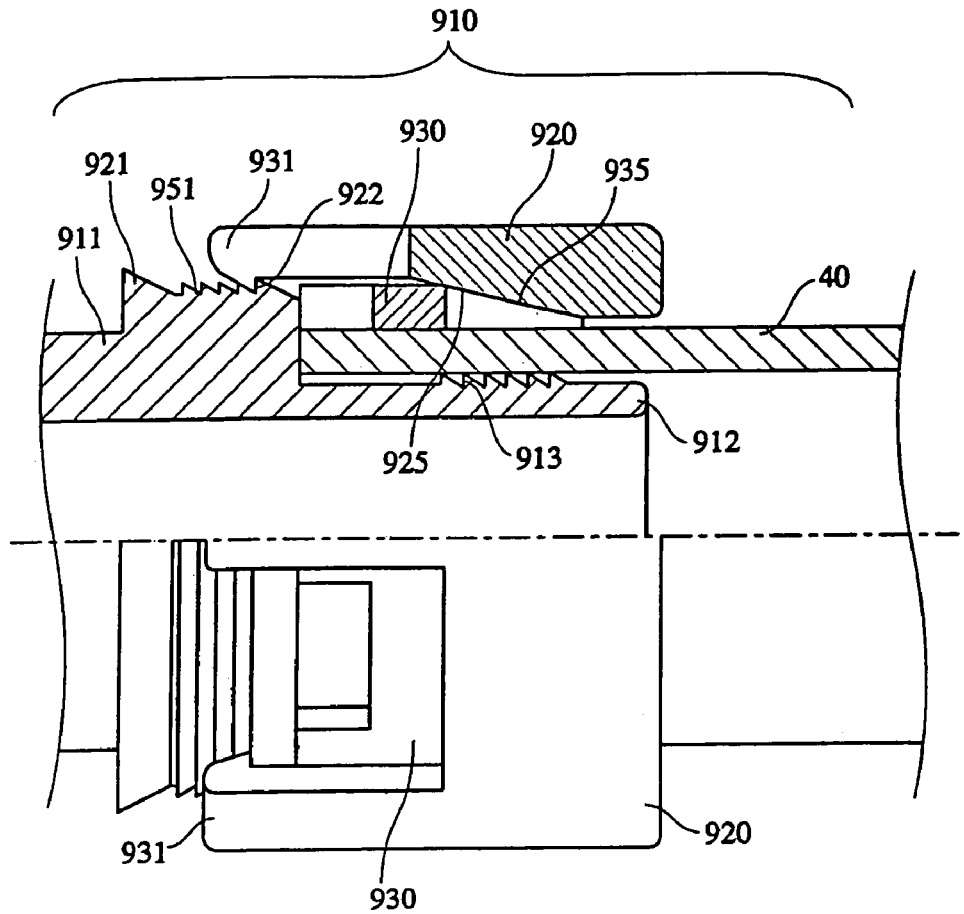
FIG. 21 is a partially cross-sectional side view showing an assembled, sleeve-type pipe joint according to the tenth embodiment of the present invention in a pre-connection state.
Figure 22:
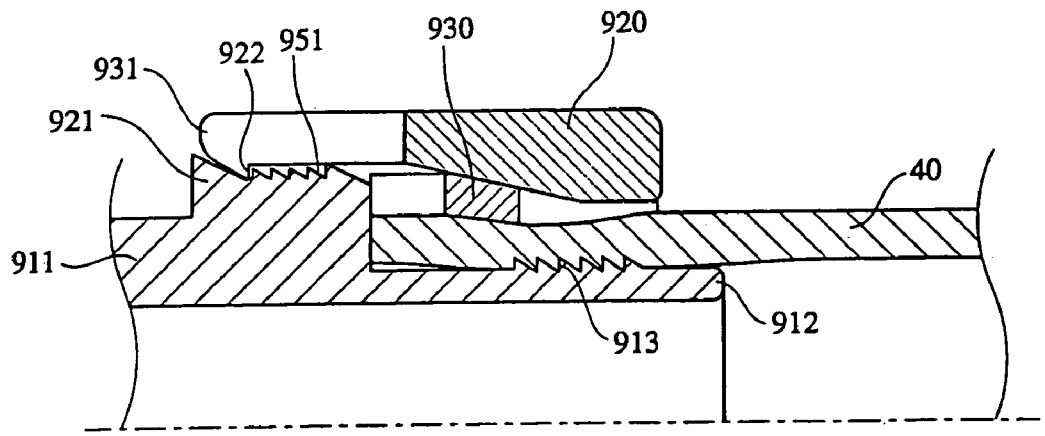
FIG. 22 is a partial cross-sectional view showing the sleeve-type pipe joint of FIG. 21 in a state in which connection to the pipe is completed.

FIGS. 21 and 22 show a sleeve-type pipe joint 910 according to the tenth embodiment of the present invention. In this embodiment, a joint body 911 comprises a plurality of saw tooth-shaped annular ridges 951 for engaging a ring member in a root portion of a cylindrical projection 912, and an annular projection 921 having a slanting surface. A ring member 920 and a sleeve member 830 have essentially the same shapes as those shown in FIGS. 16–18.

When the ring member 920 is assembled to the joint body 911 with the sleeve member 930 inserted into the ring member 920, the inner projection 922 of the ring member 920 engages one of the annular ridges 951 of the joint body 911, so that the ring member 920 and the sleeve member 930 resist detachment from the assembled pipe joint 910.

When the ring member 920 is longitudinally pushed forward with a tool, etc., the ring member 920 slidingly moves with the inner projection 922 of the ring member 920 going beyond a plurality of annular ridges 951. Thus, the inner tapered portion 925 of the ring member 920 is brought into slidable contact with the outer tapered portion 935 of the sleeve member 930, and the sleeve member 930 shrinks in diameter, thereby deforming the pipe 40 inward. As a result, the annular ridges 913 on the outer surface of the cylindrical projection 912 of the joint body 911 bite into the inner surface of the pipe 40, surely both preventing the pipe 40 from withdrawing and forming a full seal. FIG. 22 shows a state where the ring member 920 has been slidingly moved until a front end 931 of the ring member 920 abuts against the annular projection 921 of the joint body 911. By observing by the naked eye whether or not the front end 931 of the ring member 920 has abutted against the annular projection 921 of the joint body 911, the completion of connecting the sleeve-type pipe joint 910 to the pipe 40 can easily be confirmed. In this embodiment, too, because the sleeve member 930 does not slide on the pipe 40, no friction resistance is generated on the outer surface of the pipe 40, resulting in easy connection of the sleeve-type pipe joint 910.

The advantage of this embodiment is that the tight connection of the ring member 920 to the joint body 911 due to the engagement of the annular ridges 951 can be prevented from loosening, even if the piping vibrates after connection with the sleeve-type pipe joints 910. Before connection, e.g., during conveyance to a piping site, or during insertion of the pipe 40, it is possible to reduce the chances of unintentionally shrinking the sleeve member 930 by moving the ring member 920 toward the joint body 911. By choosing the materials and dimensions of the parts, the inner projection 922 of the ring member 920 will not cross the annular ridges 951 of the joint body 911 as long as the pushing force is less than about 15 kgf. In addition, as the pipe 40 is inserted into the assembled pipe joint 910, the ring member 920 is not accidentally pushed to move toward the joint body 911. Incidentally, instead of providing a plurality of annular ridges 951 to the joint body 911, the inner projection 922 of the ring member 920 may be shaped as a plurality of annular ridges to achieve the same effects.

[11] Eleventh Embodiment

FIGS. 23–26 show a sleeve-type pipe joint 1010 according to the eleventh embodiment of the present invention. A joint body usable in this embodiment may be the same as that of the first embodiment shown in FIGS. 1–4.

The feature of this embodiment is that a shrinkable member 1020 is constituted by a cylindrical sleeve portion 1030 integrally connected to a cylindrical ring portion 1024 such that they are easily disconnected. Specifically, the shrinkable member 1020 comprises a cylindrical sleeve portion 1030 comprising a flange portion 1022, a cylindrical projection 1021 extending forward from the flange portion 1022 and a pressure-receiving portion 1026 extending rearward from the flange portion 1022, and a cylindrical ring portion 1024 integrally connected to a rear end of the pressure-receiving portion 1026 of the cylindrical sleeve portion 1030 via a thin portion 1025. The sleeve portion 1030 is provided with a plurality of slits 1027 extending longitudinally in the cylindrical projection 1021, the flange portion 1022 and the pressure-receiving portion 1026.

The cylindrical projection 1021 may be in a conical shape having a slightly expanded front end or in a completely cylindrical shape having the same radius along its axis. The cylindrical projection 1021 is provided with an inward annular projection 1023 at a front end. The pressure-receiving portion 1026 has a tapered outer surface such that it becomes thinner toward a rear end. A front inner end of the ring portion 1024 is integrally connected to a rear end of the pressure-receiving portion 1026 via a thin portion 1025.

Figure 23:
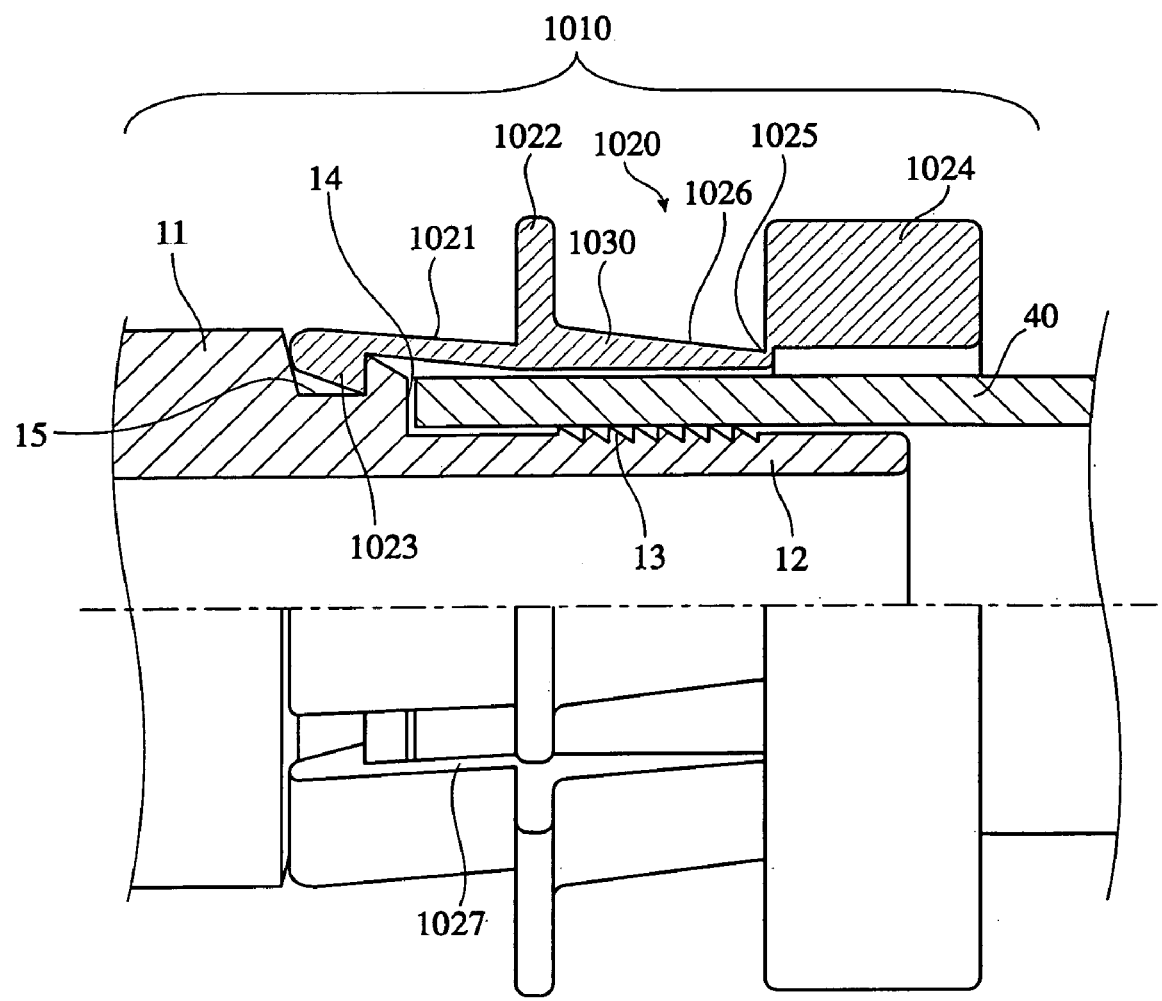
FIG. 23 is a partially cross-sectional side view showing an assembled, sleeve-type pipe joint according to the eleventh embodiment of the present invention in a pre-connection state.

The inner diameter of the ring portion 1024 is set larger than the outer diameter of the pipe 40 to the extent that the tapered pressure-receiving portion 1026 is fully reduced in diameter when the ring portion 1024 gets seated on the tapered pressure-receiving portion 1026. Though the ring portion 1024 may have a cylindrical inner surface as shown in FIG. 23, it may have an inner surface tapered complementally to the tapered pressure-receiving portion 1026 of the sleeve portion 1030, if necessary. Because the ring portion 1024 is much thicker than the pressure-receiving portion 1026 of the sleeve portion 1030, the ring portion 1024 has sufficiently large rigidity so as not to expand at the time of shrinking the pressure-receiving portion 1026. Also, the ring portion 1024 has substantially the same width (longitudinal length) as the longitudinal length of the pressure-receiving portion 1026 of the sleeve portion 1030.

Figure 25:
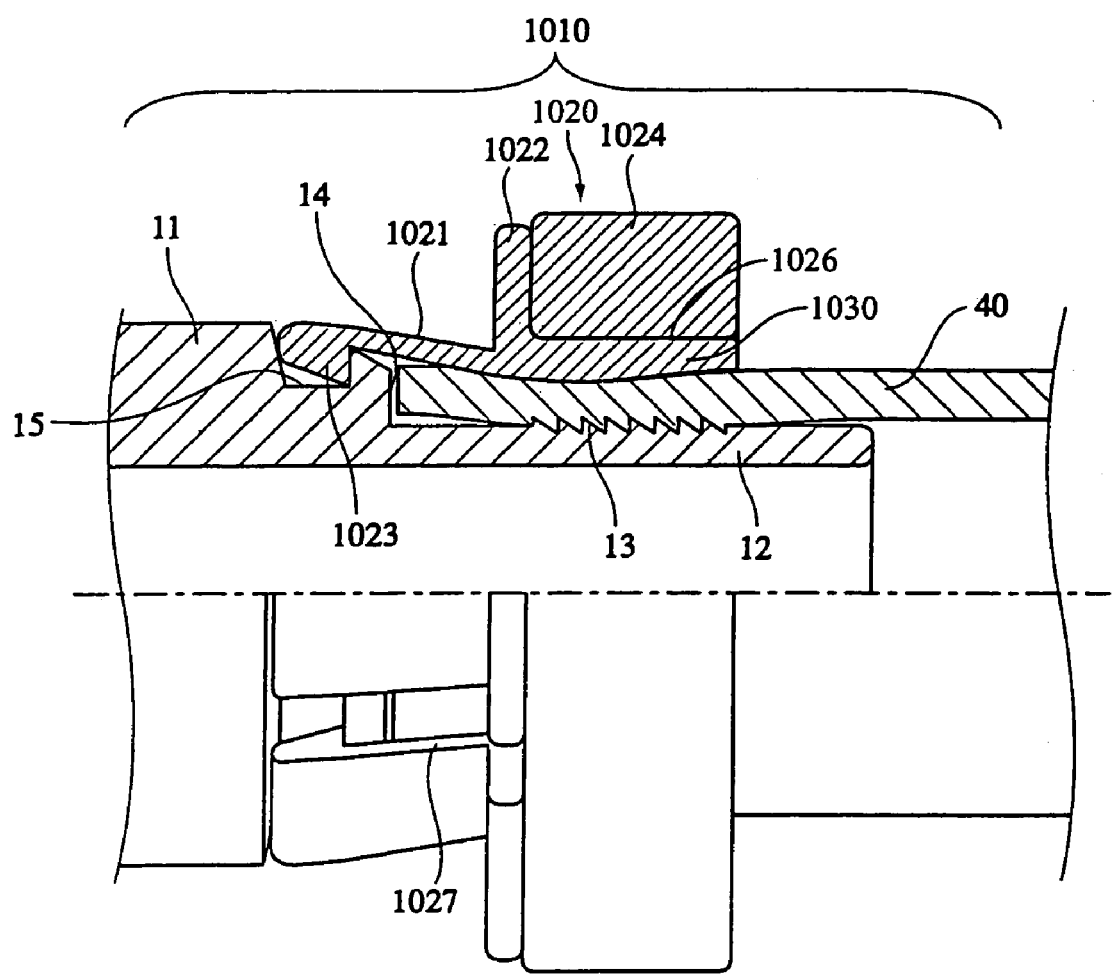
FIG. 25 is a partially cross-sectional side view showing the sleeve-type pipe joint of FIG. 23 in a state in which connection to the pipe is completed.
Figure 26:
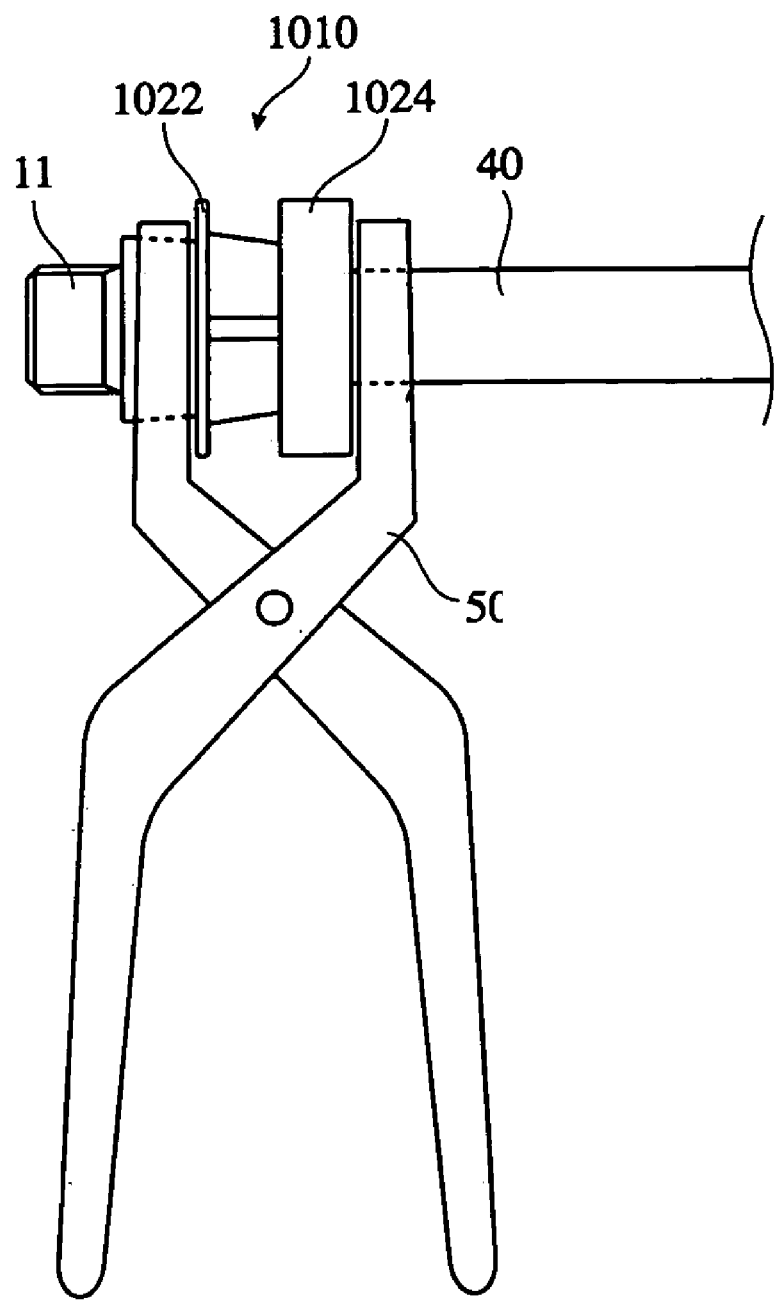
FIG. 26 is a side view showing a tool for connecting the sleeve-type pipe joint of the eleventh embodiment.

When the shrinkable member 1020 is assembled to the joint body 11 as shown in FIG. 23, the inner annular projection 1023 of the shrinkable member 1020 engages the annular groove 15 of the joint body 11, thereby preventing the shrinkable member 1020 from detaching from the joint body 11. When a manual tool 50 engages the flange portion 1022 and the rear end surface of the ring portion 1024 as shown in FIG. 26, the thin portion 1025 breaks and the ring portion 1024 is slidingly moved toward the flange portion 1022, seating the ring portion 1024 on the tapered pressure-receiving portion 1026 of the sleeve portion 1030 as shown in FIG. 25, shrinking the tapered pressure-receiving portion 1026 in diameter. Because the sleeve portion 1030 has a plurality of slits 1027 separate in a circumferential direction, it is easily reduced in diameter. Also, because the ring portion 1024 has substantially the same width (longitudinal length) as the longitudinal length of the pressure-receiving portion 1026 of the sleeve portion 1030, the ring portion 1024 is substantially entirely seated on the pressure-receiving portion 1026 when the connection of the sleeve-type pipe joint 1010 is completed.

FIG. 25 shows the completely connected sleeve-type pipe joint 1010. The pipe 40 is deformed inward by the shrinkage of the tapered pressure-receiving portion 1026 in diameter, so that the inner surface of the pipe 40 is pressed onto the outer surface of the cylindrical projection 12 of the joint body 11. Because the cylindrical projection 12 is provided with a plurality of annular ridges 13 on an outer surface, the annular ridges 13 bite into the inner surface of the pipe 40, so that the pipe 40 is prevented from detaching and is completely sealed.

Because the shrinkable member 1020 is firmly locked to the joint body 11 in this embodiment, the parts are less likely to be separated during conveyance of the sleeve-type pipe joints 1010 to a piping site, and the connection of the sleeve-type pipe joint 1010 can be carried out simply by inserting the pipe 40 into the shrinkable member 1020, and then sliding the ring portion 1024 of the shrinkable member 1020 longitudinally thus avoiding incorrect assembly. Also, because the longitudinal sliding of the ring portion 1024 can be carried out by a simple manual tool 50, the connection of the sleeve-type pipe joint 1010 is easy and efficient.

Figure 24:
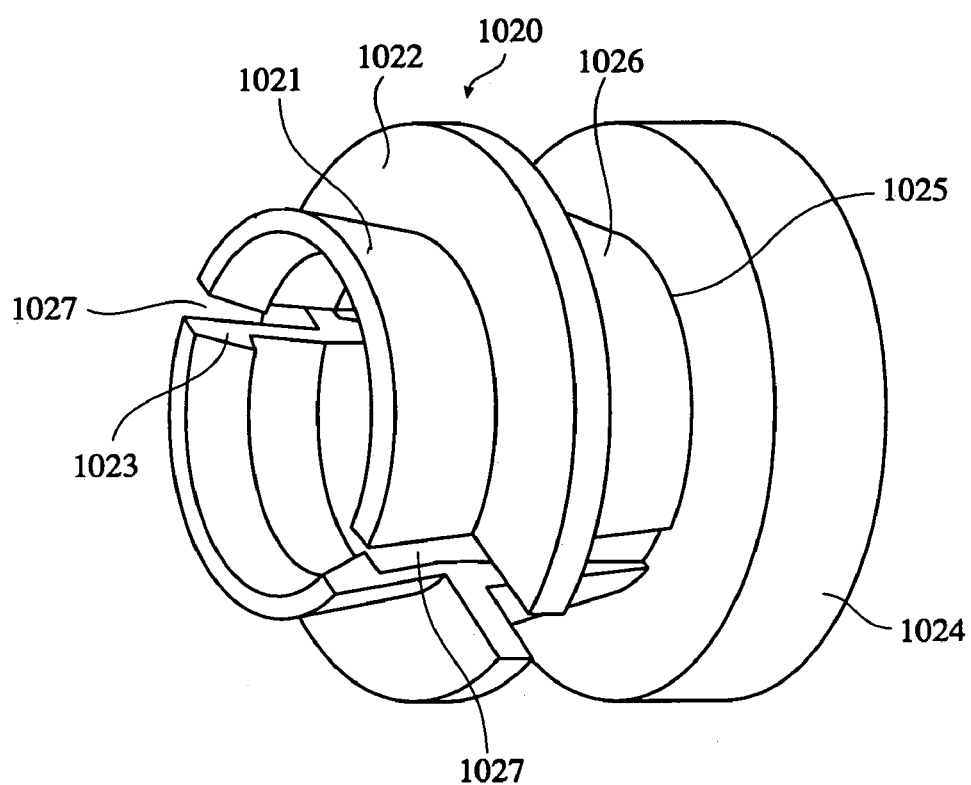
FIG. 24 is a perspective view showing a sleeve member used in the sleeve-type pipe joint of FIG. 23.

As shown in FIGS. 23 and 24, because the sleeve portion 1030 of the shrinkable member 1020 is provided with a plurality of slits 1027, it is possible to confirm through the slits 1027 by the naked eye from outside whether or not the end of the pipe 40 closely abuts against the pipe end-abutting surface 14 of the joint body 11, thereby surely preventing the insufficient insertion of the pipe 40 into the assembled pipe joint 1010.

[12] Twelfth Embodiment

Figure 27:
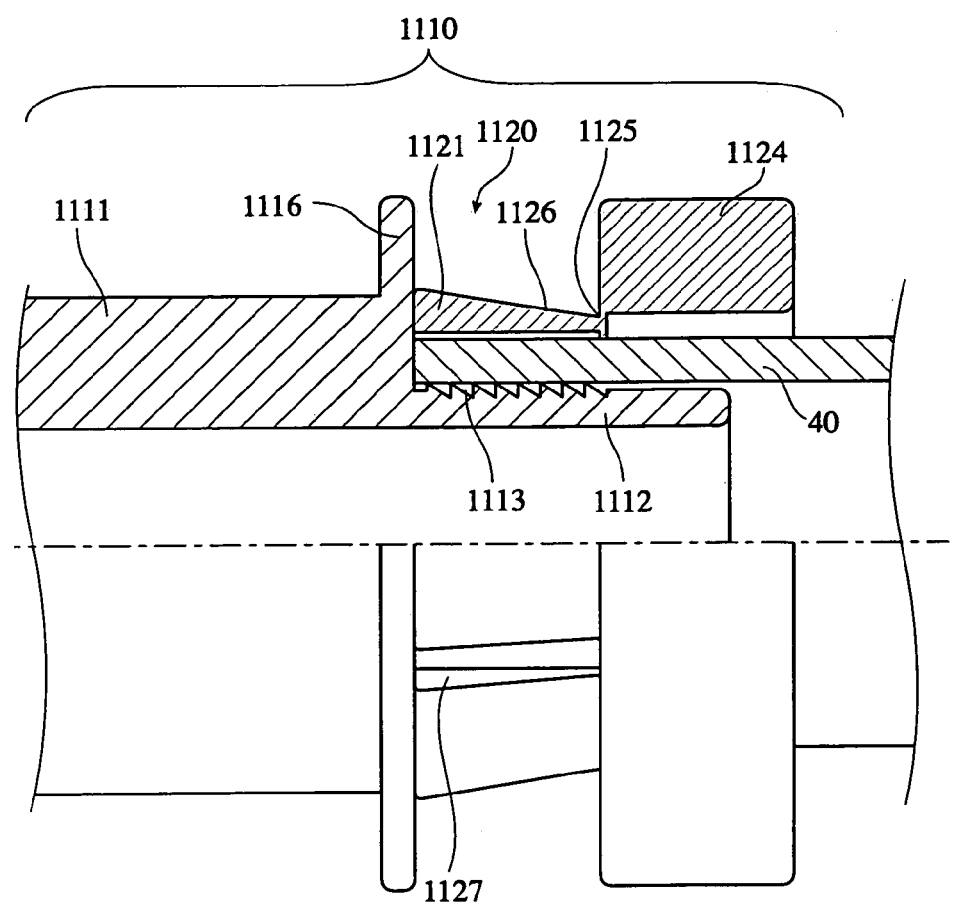
FIG. 27 is a partially cross-sectional side view showing an assembled, sleeve-type pipe joint according to the twelfth embodiment of the present invention in a pre-connection state.

FIG. 27 shows a sleeve-type pipe joint 1110 according to the twelfth embodiment of the present invention. In this embodiment, the joint body 1111 comprises a flange portion 1116 in a root portion of a cylindrical projection 1112. A shrinkable member 1120 comprises a sleeve portion 1126 having a tapered outer surface getting thinner toward its rear end, and a cylindrical ring portion 1124 integrally connected to a rear end of the sleeve portion 1126 via a thin portion 1125. The sleeve portion 1126 is provided with a plurality of slits 1127 extending longitudinally. The ring portion 1124 may be substantially the same as the ring portion 1024 in the eleventh embodiment.

When a manual tool 50 engages the flange portion 1116 of the joint body 1111 and the rear end surface of the ring portion 1124, the thin portion 1125 breaks, and the ring portion 1124 is pushed toward the flange portion 1116, seating the ring portion 1124 on the tapered sleeve portion 1126, shrinking the tapered sleeve portion 1126 in diameter. Because the ring portion 1124 has substantially the same width (longitudinal length) as the longitudinal length of the sleeve portion 1126, the ring portion 1124 is substantially entirely seated on the sleeve portion 1126 when the connection of the sleeve-type pipe joint 1110 is completed. The pipe 40 is deformed inward by the shrinkage of the sleeve portion 1126 in diameter, so that the inner surface of the pipe 40 is pressed onto the outer surface of the cylindrical projection 1112 of the joint body 1111. Because the cylindrical projection 1112 is provided with a plurality of annular ridges 1113 on an outer surface, the annular ridges 1113 bite into the inner surface of the pipe 40, so that the pipe 40 is prevented from detaching and is completely sealed.

[12] Thirteenth Embodiment

Figure 28:
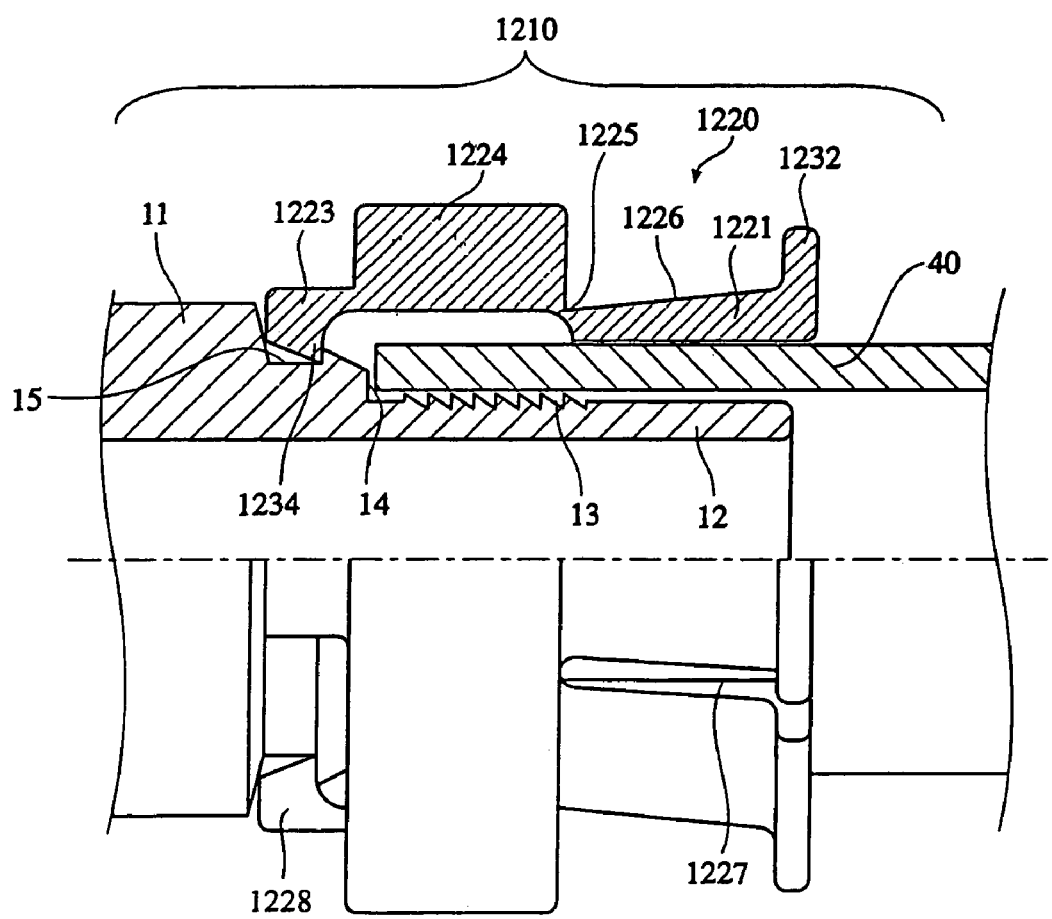
FIG. 28 is a partially cross-sectional side view showing an assembled, sleeve-type pipe joint according to the thirteenth embodiment of the present invention in a pre-connection state.

FIG. 28 shows a sleeve-type pipe joint 1210 according to the thirteenth embodiment of the present invention. In this embodiment, a shrinkable member 1220 comprises a tapered sleeve portion 1226 becoming thinner toward a front end thereof, and a thick ring portion 1224 integrally connected to a front end of the tapered sleeve portion 1226 via a thin portion 1225, an annular projection 1223 extending from a front end of the ring portion 1224, and an inner projection 1234 provided at a tip end of the annular projection 1223. A flange portion 1232 is integrally connected to a rear end of the tapered sleeve portion 1226. A plurality of slits 1227 longitudinally extend in the tapered sleeve portion 1226 and the flange portion 1232. The annular projection 1223 is provided with a plurality of windows 1228, through which it is possible to confirm by the naked eye whether or not the end of the pipe 40 abuts against the pipe end-abutting surface 14 of the joint body 11.

Because the ring portion 1224 is much thicker than the tapered sleeve portion 1226, the ring portion 1224 has sufficiently large rigidity so as not to expand at the time of shrinking the tapered sleeve portion 1226. The ring portion 1224 has substantially the same width (longitudinal length) as the longitudinal length of the tapered sleeve portion 1226.

When the shrinkable member 1220 is assembled to the joint body 11 as shown in FIG. 28, the inner annular projection 1234 of the shrinkable member 1220 engages the annular groove 15 of the joint body 11 thereby preventing the shrinkable member 1220 from detaching from the joint body 11. When a manual tool engages the flange portion 1232 and the front end surface of the ring portion 1224, the thin portion 1225 breaks and the tapered sleeve portion 1226 is pushed toward the ring portion 1224, forcing the tapered sleeve portion 1226 to enter into the ring portion 1224, shrinking the tapered sleeve portion 1226 in diameter. Because the tapered sleeve portion 1226 has a plurality of slits 1227 separate in a circumferential direction, it is easily reduced in diameter. Also, because the ring portion 1224 has substantially the same width (longitudinal length) as the longitudinal length of the tapered sleeve portion 1226, the ring portion 1224 is substantially entirely seated on the tapered sleeve portion 1226 when the connection of the sleeve-type pipe joint 1210 is completed.

The pipe 40 is deformed inward by the shrinkage of the tapered sleeve portion 1226 in diameter, so that the inner surface of the pipe 40 is pressed onto the outer surface of the cylindrical projection 12 of the joint body 11. Because the cylindrical projection 12 is provided with a plurality of annular ridges 13 on an outer surface, the annular ridges 13 bite into the inner surface of the pipe 40, so that the pipe 40 is prevented from detaching and is completely sealed.

In any embodiments, the joint body adapted to be tightly connected to the pipe 40 should be made of materials having extremely larger rigidity than the pipe and sleeve member, so that it is not deformed during the connection operation of the sleeve-type pipe joint. Accordingly, the joint body is preferably made of metals or high-rigidity plastics. Though the ring member may also be made of metals or high-rigidity plastics, it may be the same as the sleeve member in material because it is provided with higher rigidity by making it thicker. The materials of the sleeve member are preferably plastics having large elasticity constants such as polyethylene, polypropylene, etc. so that it may easily shrink in diameter. In the case of the eleventh to thirteenth embodiments using a shrinkable member integrally constituted by a sleeve portion and a ring portion, the overall shrinkable member is integrally formed from plastics by injection molding, etc.

As described above in detail, the sleeve-type pipe joint of the present invention has a structure in which a ring member (or portion) and a tapered sleeve member (or portion) are forced together by a tool causing the sleeve member (or portion) to shrink, thereby compressing a pipe such that the pipe is tightly connected to a cylindrical projection of the joint body. Accordingly, the sleeve-type pipe joint can be constituted by a minimum number of parts. Also, because the sleeve-type pipe joint of the present invention can be connected to the pipe simply and surely, the connection operation time is greatly reduced. In addition, the connection strength is unlikely to be uneven, and it is easy to confirm the connected conditions, reducing the chances of suffering from the consequences of an incomplete or poor connection.

What is claimed is:

1. A sleeve-type pipe joint comprising a joint body having a cylindrical projection adapted to be inserted into a pipe to be connected; and a shrinkable member mounted onto an outer surface of said pipe; said shrinkable member comprising a resiliently deformable sleeve portion having a tapered portion on an outer surface, and a high-rigidity ring portion integrally connected to said sleeve portion via a thin portion; the relative movement of said sleeve portion and said ring portion toward each other causing said ring portion to get seated on said sleeve portion with said thin portion cut, whereby said sleeve portion is deformed inward, resulting in the tight connection of the inner surface of said pipe to the outer surface of said cylindrical projection.

2. The sleeve-type pipe joint according to claim 1, wherein said shrinkable member has at least one portion engageable with said joint body.

3. The sleeve-type pipe joint according to claim 1, wherein said sleeve portion has a flange portion.

4. The sleeve-type pipe joint according to claim 1, wherein said sleeve portion has at least one longitudinal slit.

5. A sleeve-type pipe joint comprising a joint body having a cylindrical projection adapted to be inserted into a pipe to be connected; and a shrinkable member mounted onto an outer surface of said pipe; said shrinkable member comprising a resiliently deformable sleeve portion integrally having at least one portion engageable with said joint body, a flange portion and a shrinkable portion having a tapered outer surface in this order, with at least one slit extending longitudinally, and a high-rigidity ring portion integrally connected to a rear end of said sleeve portion via a thin portion; the sliding movement of said ring portion toward said joint body causing said ring portion to get seated on said sleeve portion with said thin portion cut, whereby said sleeve portion is deformed inward, resulting in the tight connection of the inner surface of said pipe to the outer surface of said cylindrical projection.

6. The sleeve-type pipe joint according to claim 5, wherein an inner projection of said shrinkable member engages an annular groove of said joint body.

7. A sleeve-type pipe joint comprising a joint body having a cylindrical projection adapted to be inserted into a pipe to be connected and a flange portion extending near a root portion of said cylindrical projection; and a shrinkable member mounted onto an outer surface of said pipe; said shrinkable member comprising a resiliently deformable sleeve portion having a tapered outer surface with at least one slit extending longitudinally, and a high-rigidity ring portion integrally connected to a rear end of said sleeve portion via a thin portion; the sliding movement of said ring portion toward said joint body causing said ring portion to get seated on said sleeve portion with said thin portion cut, whereby said sleeve portion is deformed inward, resulting in the tight connection of the inner surface of said pipe to the outer surface of said cylindrical projection.

8. A sleeve-type pipe joint comprising a joint body having a cylindrical projection adapted to be inserted into a pipe to be connected; and a shrinkable member mounted onto an outer surface of said pipe; said shrinkable member comprising a high-rigidity ring portion, at least one portion engageable with said joint body, which integrally extends from a front end of said ring portion, and a resiliently deformable sleeve portion integrally connected to a rear end of said ring portion via a thin portion; said sleeve portion comprising a shrinkable portion having a tapered outer surface and a flange portion in this order from the side of said joint body with at least one slit extending longitudinally; the sliding movement of said sleeve portion toward said joint body causing said sleeve portion to enter into a space between said ring portion and said pipe with said thin portion cut, whereby said sleeve portion is deformed inward, resulting in the tight connection of the inner surface of said pipe to the outer surface of said cylindrical projection.

* * * * *